United States Patent
Le Gallic

(10) Patent No.: US 12,440,918 B2
(45) Date of Patent: Oct. 14, 2025

(54) INSTALLATION FOR MANUFACTURING A MANUFACTURED OBJECT BY ADDITIVE FRICTION STIR DEPOSITION AND ASSOCIATED MANUFACTURING METHOD

(71) Applicant: DASSAULT AVIATION, Paris (FR)

(72) Inventor: Joël Le Gallic, Biarritz (FR)

(73) Assignee: DASSAULT AVIATION, Paris (FR)

( * ) Notice: Subject to any disclaimer, the term of this patent is extended or adjusted under 35 U.S.C. 154(b) by 0 days.

(21) Appl. No.: 18/764,989

(22) Filed: Jul. 5, 2024

(65) Prior Publication Data

US 2025/0010396 A1    Jan. 9, 2025

(30) Foreign Application Priority Data

Jul. 7, 2023   (FR) ...................................... 2307287

(51) Int. Cl.
| | |
|---|---|
| *B23K 20/12* | (2006.01) |
| *B33Y 10/00* | (2015.01) |
| *B33Y 30/00* | (2015.01) |

(52) U.S. Cl.
CPC ...... *B23K 20/1215* (2013.01); *B23K 20/1245* (2013.01); *B33Y 10/00* (2014.12); *B33Y 30/00* (2014.12)

(58) Field of Classification Search
CPC ............ B23K 20/1215; B23K 20/1245; B23K 20/128; B23K 20/122–1295; B33Y 10/00; B33Y 30/00

USPC .............................. 228/112.1–114.5, 2.1–2.3
See application file for complete search history.

(56) References Cited

U.S. PATENT DOCUMENTS

| | | | |
|---|---|---|---|
| 6,572,007 B1 * | 6/2003 | Stevenson ............ | B23K 20/128 228/2.1 |
| 2023/0146110 A1 | 5/2023 | Allison et al. | |
| 2025/0010396 A1 * | 1/2025 | Le Gallic ............. | B23K 20/128 |

FOREIGN PATENT DOCUMENTS

| | | | | |
|---|---|---|---|---|
| DE | 102020125628 A1 * | 7/2021 | ............. | B22F 12/53 |
| FR | 3100006 A1 * | 2/2021 | ............. | B33Y 10/00 |
| KR | 102255062 B1 * | 5/2021 | ............. | B33Y 10/00 |

OTHER PUBLICATIONS

Search Report for priority application FR 2307287.

* cited by examiner

*Primary Examiner* — Kiley S Stoner
(74) *Attorney, Agent, or Firm* — Davidson Kappel LLC

(57) ABSTRACT

An manufacturing installation for manufacturing a manufactured object by additive friction stir deposition includes a manufacturing system configured to manufacture a manufactured object by additive friction stir deposition from a manufacturing material, and a feed system configured to feed the manufacturing system with manufacturing material. The feed system includes a spool of a manufacturing material wire wound about a spool axis; an unwinding device configured to unwind the wire, to drive the spool in rotation about a principal axis of rotation and to drive the wire in rotation about its neutral fiber; and a device for guiding the unwound wire to the manufacturing system.

20 Claims, 14 Drawing Sheets

INSTALLATION FOR MANUFACTURING A MANUFACTURED OBJECT BY ADDITIVE FRICTION STIR DEPOSITION AND ASSOCIATED MANUFACTURING METHOD

The present disclosure relates to an installation for manufacturing a manufactured object by additive friction stir deposition from a manufacturing material.

BACKGROUND

In the state of the art, installations are known comprising an additive friction stir deposition system and a system for feeding the manufacturing system with manufacturing material.

It is known that the feed system comprises a barrel or magazine in which are installed a plurality of bars of manufacturing material with a square cross-section. These bars of manufacturing material are discharged one after the other from the barrel or magazine to feed the manufacturing system. In such installations, the bar fed to the manufacturing system is then introduced into a stirring pin to be stirred in order to manufacture the manufactured object.

However, the use of such barrels or magazines present several disadvantages.

Firstly, preparation of the bars intended to be loaded into such a barrel or magazine is time-consuming and tedious. Indeed, each of these bars must present precise dimensions that complement the dimensions of a barrel or magazine chamber into which it is to be inserted.

In addition, these barrels or magazines have to be frequently reloaded with bars by a human operator. This complicates the manufacture of the object and represents a risk for the operator.

Also, the square cross-section of the bars reduces the homogeneity of the material added taking place during manufacturing by additive friction stirring at the exit of the stirring pin, which is generally cylindrical or frustoconical. Indeed, the loss of load during material flow is not uniform before this material reaches the periphery of the pin.

The transition between two successive bars during manufacture presents a significant risk of introducing defects. In particular, this transition can lead to a lack of material during manufacture, to the remainder of the bar being consumed not being held when the stirring pin is raised, or to inhomogeneity in the fluidity of the material added during manufacture.

SUMMARY

One aim of the present disclosure is therefore to propose a manufacturing installation that is simple, fast and efficient, that presents less risk for an operator intended to interact with it and that leads to the manufacture of an object of superior quality.

The present disclosure provides an installation for manufacturing a manufactured object, comprising:
  a manufacturing system configured to manufacture the manufactured object by additive friction stir deposition from a manufacturing material; and
  a feed system configured to feed the manufacturing system with manufacturing material;
  the feed system comprising:
    a spool of manufacturing material wound about a spool axis, the manufacturing material wire presenting a neutral fiber;
    a rotary unwinding device configured to unwind the manufacturing material wire from the spool; and
    a device for guiding the unwound manufacturing material wire from the rotary unwinding device to the manufacturing system;
  the rotary unwinding device being configured to:
    drive the spool in rotation about a principal axis of rotation; and
    drive the unwound manufacturing material wire in rotation about its neutral fiber.

According to other advantageous aspects of the present disclosure, the installation comprises one or more of the following features, taken individually or in any technically possible combination:
  the device for guiding the unwound manufacturing material wire comprises a guide sheath extending from a proximal end connected to the rotary unwinding device to a distal end connected to the manufacturing system, the guide sheath being configured to guide the unwound manufacturing material wire from the rotary unwinding device to the manufacturing system;
  the rotary unwinding device comprises:
  a support;
  a rotation mechanism mounted on the support and configured to drive the spool in rotation about the principal axis of rotation; and
  a mechanism for guiding the unwound manufacturing material wire, configured to guide the unwound manufacturing material wire to the guide device and configured to constrain the unwound manufacturing material wire so that the unwound manufacturing material wire turns about its neutral fiber at the inlet of the guide device;
  the guide device comprises an inlet intended to receive the unwound manufacturing material wire supplied by the rotary unwinding device, the guide mechanism being configured so that the trajectory of the unwound manufacturing material wire describes, between the spool and the inlet of the guide device, a substantially conical helix trajectory, the cone of which has its apex facing the inlet of the guide device;
  the rotation mechanism is configured to drive the spool and the guide mechanism together in rotation about the principal axis of rotation, the guide mechanism comprising a central frame including:
  a central column extending according to a column axis coincident with the principal axis of rotation from a proximal end mounted on the rotation mechanism to a distal end mounted facing the inlet of the guide device;
  a plurality of guide arms mounted on the central column so as to be distributed along the column axis, each guide arm extending substantially perpendicular to the column axis from the central column, each guide arm comprising a tubular guide element delimiting an unwound manufacturing material wire guide orifice through which the unwound manufacturing material wire is intended to extend;
  the tubular guide element comprises at least one rolling part, extending substantially into the guide orifice and intended to cooperate with the unwound manufacturing material wire as it passes through the guide orifice;
  the central frame further comprises a dynamic balancing means mounted on the central column and arranged so that the masses of the dynamic balancing means, the guide arms and the unwound manufacturing material wire are distributed substantially symmetrically about the principal axis of rotation;

the dynamic balancing means comprises a balancing wire and a plurality of balancing arms mounted on the central column so as to be distributed along the column axis, each balancing arm extending substantially perpendicular to the column axis from the central column to a radial end, each balancing arm comprising a tubular holding element delimiting a balancing wire holding orifice through which the balancing wire extends, the balancing arms and balancing wire being arranged so that the mass of the balancing arms and balancing wire is distributed symmetrically about the principal axis of rotation in relation to the mass of the guide arms and the unwound manufacturing material wire;

the manufacturing system comprises:

at least one motor;

an effector configured to be driven in rotation by the at least one motor;

a stirring pin configured to be driven in rotation by the effector, the stirring pin being intended to stir the unwound manufacturing material wire to manufacture the manufactured object;

a device for feeding the unwound manufacturing material wire, configured to displace the unwound manufacturing material wire toward the stirring pin;

the speed of rotation of the stirring pin is substantially equal to the speed of rotation of the unwound manufacturing material wire about its neutral fiber;

the principal axis of rotation is coincident with the spool axis, the rotation mechanism comprising a plate which is movable in rotation about the principal axis of rotation, the spool being intended to rest on the plate so that the spool axis is substantially perpendicular to the plate and so that rotation of the plate about the principal axis of rotation drives the rotation of the spool about the principal axis of rotation;

the rotation mechanism further comprises:

a motor;

a shaft extending substantially according to the principal axis of rotation and configured to be driven in rotation by the motor about the principal axis of rotation; and—a freewheel;

the plate being mounted on the shaft by means of the freewheel, the rotation of the shaft about the principal axis of rotation driving the rotation of the plate about the principal axis of rotation via the freewheel, the freewheel allowing a further rotation of the plate about the principal axis of rotation relative to the shaft, the feed of the unwound manufacturing material wire by the feed device drives the additional rotation of the plate about the principal axis of rotation relative to the shaft and the unwinding of the manufacturing material wire from the spool;

the speed of the additional rotation of the plate about the principal axis of rotation relative to the shaft is between 0 rpm and 100 rpm, for example between 0 rpm and 5 rpm;

the rotation mechanism also comprises spool containment means, the containment means being mounted on the shaft so as to be movable in rotation about the principal axis of rotation together with the shaft, the containment means comprising a containment apparatus including at least one containment element movable in translation according to a radial direction substantially orthogonal to the principal axis of rotation between:

a strong bearing position in which the at least one containment element bears against the outer circumference of the spool so as to secure the spool and the plate to the shaft in rotation; and a weak bearing position in which the at least one containment element bears on the outer circumference of the spool so as to allow the additional rotation of the plate about the principal axis of rotation relative to the shaft, while confining the spool radially relative to the principal axis of rotation;

the containment means further comprises a constraint apparatus configured to radially constrain the at least one containment element against the spool in the direction of the principal axis of rotation;

the containment means further comprises a complementary constraint apparatus configured to radially constrain the spool in the direction of the at least one containment element;

the principal axis of rotation is substantially perpendicular to the spool axis and passes through the center of the spool, the spool being mounted movable in rotation about the spool axis on the rotation mechanism;

the forward movement of the unwound manufacturing material wire by the feed device drives the additional rotation of the spool about the spool axis and the unwinding of the manufacturing material wire from the spool;

the guide mechanism comprises a guide funnel including a tubular passage extending substantially according to the principal axis of rotation facing the inlet of the guide device, the tubular passage being intended to channel the unwound manufacturing material wire so that the wire rotates about its neutral fiber at the inlet of the guide device;

the installation further comprises an auxiliary manufacturing system configured to manufacture the manufactured object or to manufacture an auxiliary manufactured object by additive friction stir deposition from the manufacturing material, the feed system being further configured to feed the auxiliary manufacturing system with manufacturing material, the feed system further comprising an auxiliary spool of manufacturing material wire wound about an auxiliary spool axis, the rotary unwinding device being further configured to unwind the manufacturing material wire from the auxiliary spool, the feed system further comprising an auxiliary guide device for the manufacturing material wire unwound from the auxiliary spool from the rotary unwinding device to the auxiliary manufacturing system, the auxiliary manufacturing system comprising:

an auxiliary stirring pin intended for stirring the manufacturing material wire unwound from the auxiliary spool to manufacture the manufactured object or auxiliary manufactured object; and an auxiliary feed device for feeding the manufacturing material wire unwound from the auxiliary spool, configured to displace the manufacturing material wire unwound from the auxiliary spool toward the auxiliary stirring pin;

the stirring pin and the auxiliary stirring pin being able to be arranged in a symmetrical manner relative to a plane of symmetry, so that vectors of the forces exerted respectively by the stirring pin and by the auxiliary stirring pin are of substantially equal norms but of opposite direction, and so that the manufacturing material of the spool and the manufacturing material of the auxiliary spool are stirred and fed according to respective symmetrical trajectories.

the auxiliary manufacturing system comprises:

at least one auxiliary motor;

an auxiliary effector configured to be driven in rotation by the at least one auxiliary motor;

an auxiliary device for feeding the manufacturing material wire unwound from the auxiliary spool, configured to displace the wire of manufacturing material unwound from the auxiliary spool toward the auxiliary stirring pin;

the auxiliary stirring pin being configured to be driven in rotation by the auxiliary effector;

the spool and the auxiliary spool are mounted on the rotation mechanism so that the spool and auxiliary spool extend in the same plane, the rotation mechanism being configured to drive the spool and auxiliary spool together in rotation about a principal axis of rotation, the principal axis of rotation extending substantially tangentially relative to the outer circumference of each of the spool and auxiliary spool;

the manufacturing material wire on the spool is intended to be fed toward the guide device according to a general direction, the manufacturing material wire on the auxiliary spool being intended to be fed to the auxiliary guide device according to an auxiliary general direction substantially opposite to the general direction, the general direction and the auxiliary general direction being substantially parallel to the principal axis of rotation of the rotation mechanism; and the feeding of the manufacturing material wire unwound by the feed device drives the additional rotation of the spool about the spool axis and the unwinding of the manufacturing material wire from the spool, the feeding of the manufacturing material wire unwound by the auxiliary feed device driving the additional rotation of the auxiliary spool about the auxiliary spool axis and the unwinding of the manufacturing material wire from the auxiliary spool.

The present disclosure also has as its object a method of manufacturing a manufactured object from a manufacturing material using a manufacturing installation as described above, the method comprising:

a step of feeding manufacturing material to the manufacturing system by the feed system; and a step of manufacturing the manufactured object by additive friction stir deposition from the manufacturing material by the manufacturing system;

the feeding step comprising a sub-step of unwinding the manufacturing material wire from the spool by the rotary unwinding device and a sub-step of guiding the unwound manufacturing material wire from the rotary unwinding device to the manufacturing system by the guiding device, the unwinding sub-step further comprising:

rotating the spool about the principal axis of rotation; and rotating the unwound manufacturing material wire about its neutral fiber by the rotary unwinding device.

BRIEF SUMMARY OF THE DRAWINGS

The present disclosure will become clearer on reading the following description, given solely by way of non-limiting example, and made with reference to the drawings in which.

DETAILED DESCRIPTION

With reference to FIGS. 1 to 11, an installation 10 is described for manufacturing a manufactured object according to a first embodiment, in particular by additive friction stir deposition from a manufacturing material.

The installation 10 comprises a manufacturing system 20 and a system 40 for feeding manufacturing material to the manufacturing system 20.

The manufacturing system 20 is configured to manufacture the manufactured object by additive friction stir deposition from the manufacturing material.

Figure 1:
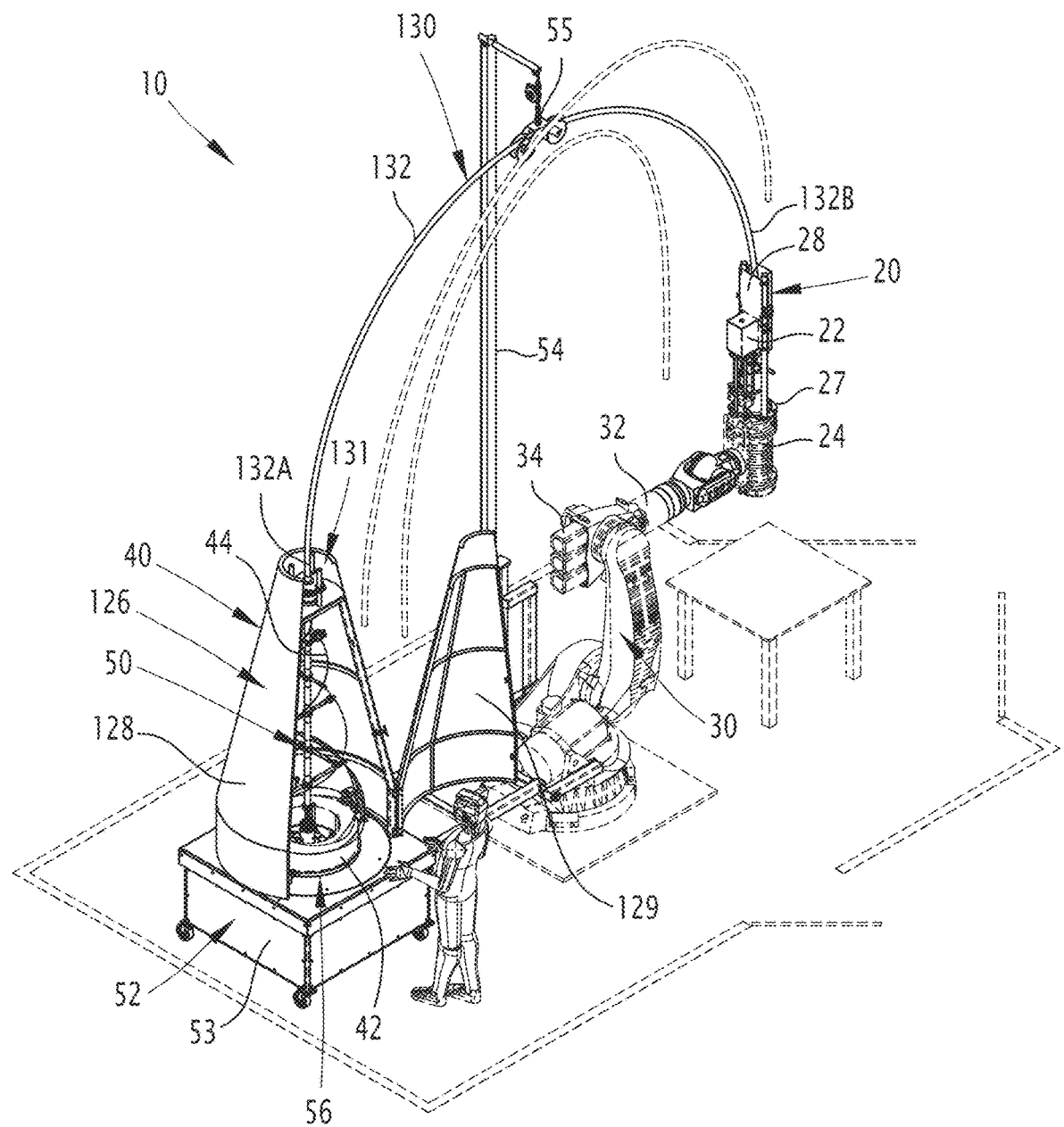
FIG. 1 is a top perspective view of the manufacturing installation according to a first embodiment of the present disclosure.
Figure 2:
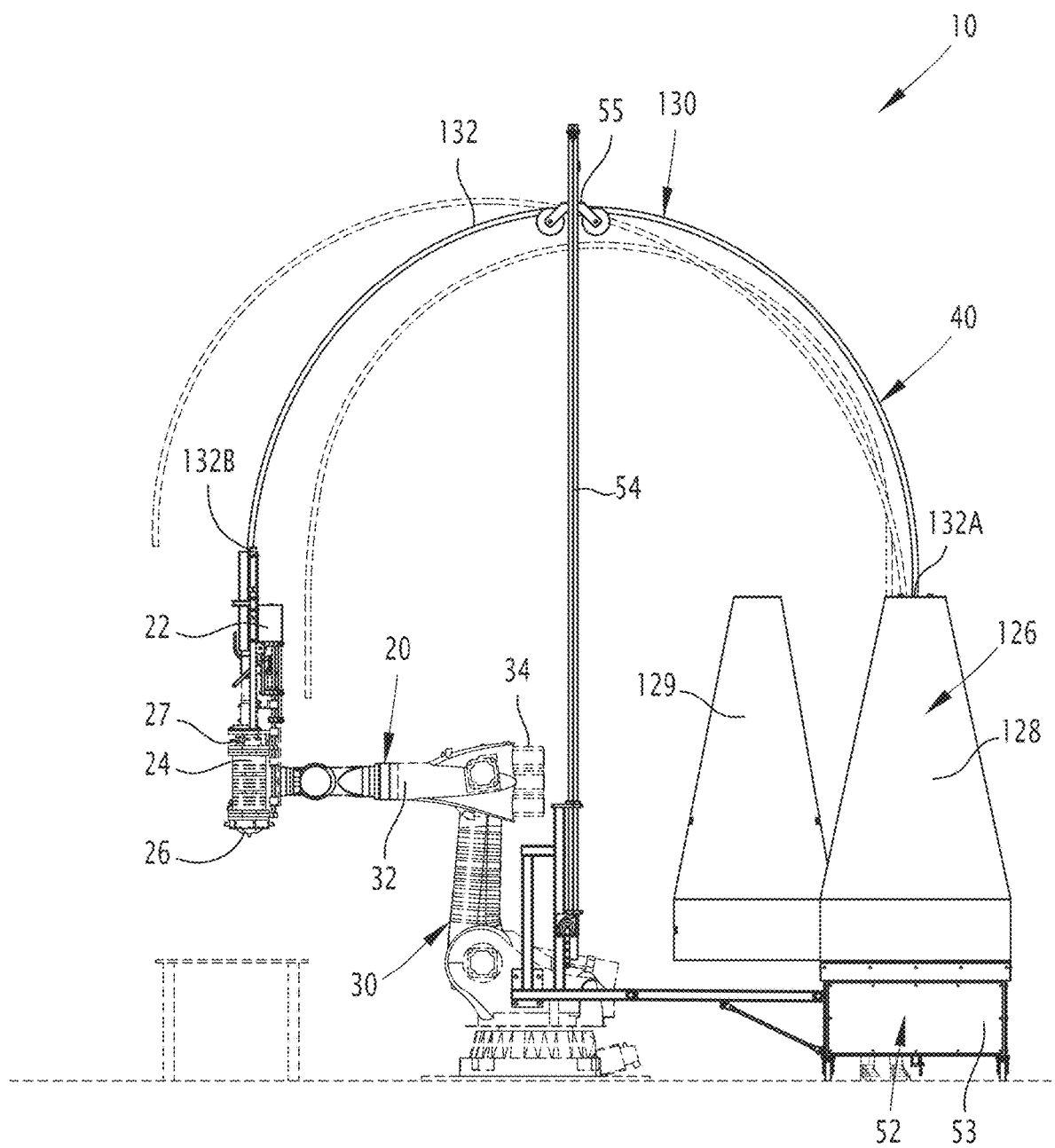
FIG. 2 is a side view of the manufacturing installation shown in FIG. 1.

With reference to FIGS. 1 and 2, the manufacturing system 20 comprises, for example, at least one motor 22, an effector 24, a stirring pin 26 and a feed device 27.

Optionally, the manufacturing system 20 also comprises a straightener 28.

For example, as illustrated in FIGS. 1 and 2, the manufacturing system 20 further comprises a robot 30 configured to manipulate the assembly including the at least one motor 22, the effector 24, the stirring pin 26, the feed device 27 and optionally the straightener 28.

The effector 24 is configured to be driven in rotation by the at least one motor 22.

The stirring pin 26 is configured to be driven in rotation by the effector 24.

In particular, the stirring pin 26 is intended to stir an unwound manufacturing material wire 44, supplied by the feed system 40 (described in more detail below), to manufacture the manufactured object. In particular, stirring the unwound manufacturing material wire 44, allows the manufacturing material wire to be made malleable in order that this malleable material can be added to a substrate to progressively manufacture the manufactured object.

The feed device 27 is a device for feeding the unwound manufacturing material wire 44. The device 27 is configured to displace the unwound manufacturing material wire 44 toward the mixing pin 26. The unwound manufacturing material wire 44 is continuous, so that the manufacturing material is supplied in a continuous manner to the mixing pin 26, in particular by the feed device 27, as the manufacturing material is consumed.

Advantageously, as will be described in more detail below, the feed device 27 is configured to drive a plate 58 of a rotation mechanism 56 of a rotary unwinding device 50 of the feed system 40, in rotation about a principal axis of rotation R1 relative to a shaft 62 of the rotation mechanism 56, by feeding the wire 44, in particular by means of a freewheel 59.

The straightener 28 is arranged upstream of the stirring pin 26.

The straightener 28 is configured to straighten the curvature of the unwound manufacturing material wire 44 toward 0.

The robot 30 comprises at least one articulated arm 32 and at least one motorization device 34 configured to displace the at least one articulated arm 32.

The at least one articulated arm 32 carries the assembly including the at least one motor 22, the effector 24, the stirring pin 26, the feed device 27 and, if required, the straightener 28.

The at least one arm 32 is displaceable between a plurality of positions, allowing the stirring pin 26 to be arranged in a precise manner relative to the substrate of the manufactured object to be manufactured.

Advantageously, the manufacturing system 20 further comprises a motorization adaptation unit (not illustrated) configured to control and pilot, in torque and force, the rotation of the stirring pin 26 (by controlling and piloting, for example, the torque generated by the at least one motor 22 and the force generated by the robot 30) and the consumption of the manufacturing material during stirring. Advantageously, the consumption of manufacturing material during stirring determines the feed of manufacturing material provided by the feed system 40. In particular, the motorization adaptation unit is further configured to control and pilot the feed device 27, in order to adapt the feed of manufacturing material to the stirring pin 26 as a function of the consumption of manufacturing material during stirring.

The feed system 40 is configured to feed the manufacturing system 20 with manufacturing material, in particular, as a function of the manufacturing material requirements of the manufacturing system 20.

The feed system 40 comprises a spool 42 of manufacturing material wire, a rotary unwinding device 50 and a guide device 130.

The spool 42 (visible in FIGS. 1, 5 and 6) comprises the manufacturing material wire 44 wound about a spool axis A-A'.

Advantageously, the spool 42 is intended to rest on the plate 58 of the rotation mechanism 56 of the rotary unwinding device 50 so that the spool axis A-A' is substantially perpendicular to the plate 58 and so that rotation of the plate 58 about the principal axis of rotation R1 drives the rotation of the spool 42 about the principal axis of rotation R1.

The manufacturing material is, for example, an alloy of iron, nickel, titanium, aluminum and/or magnesium. According to one particular example, the manufacturing material is invar, in other words, an alloy of iron and nickel.

The spool 42 comprises, in particular, between 15 kg and 50 kg of manufacturing material, preferably between 25 kg and 40 kg of manufacturing material.

The manufacturing material wire 44 is, for example, a wire of substantially circular normal section, presenting a diameter of between 2 mm and 6 mm, preferably between 3 mm and 5 mm, in particular substantially equal to 4 mm.

The manufacturing material wire 44 has a neutral fiber. By "neutral fiber", we mean a line passing through the center of gravity of the normal section of the wire 44.

The rotary unwinding device 50 is configured to unwind the manufacturing material wire 44 from the spool 42.

As will be described in more detail below, the rotary unwinding device 50 is configured to:
drive the spool 42 in rotation about a principal axis of rotation R1; and
drive the unwound manufacturing material wire 44 in rotation about its neutral fiber.

In particular, the rotary unwinding device 50 comprises a support 52, the rotation mechanism 56, and a guide mechanism 100.

Even more advantageously, as visible in FIGS. 1 to 3, 10 and 11, the rotary unwinding device 50 also comprises a protection mechanism 126.

The support 52 is configured to support the rotation mechanism 56, the guide mechanism 100 and, where applicable, the protection mechanism 126.

Figure 3:
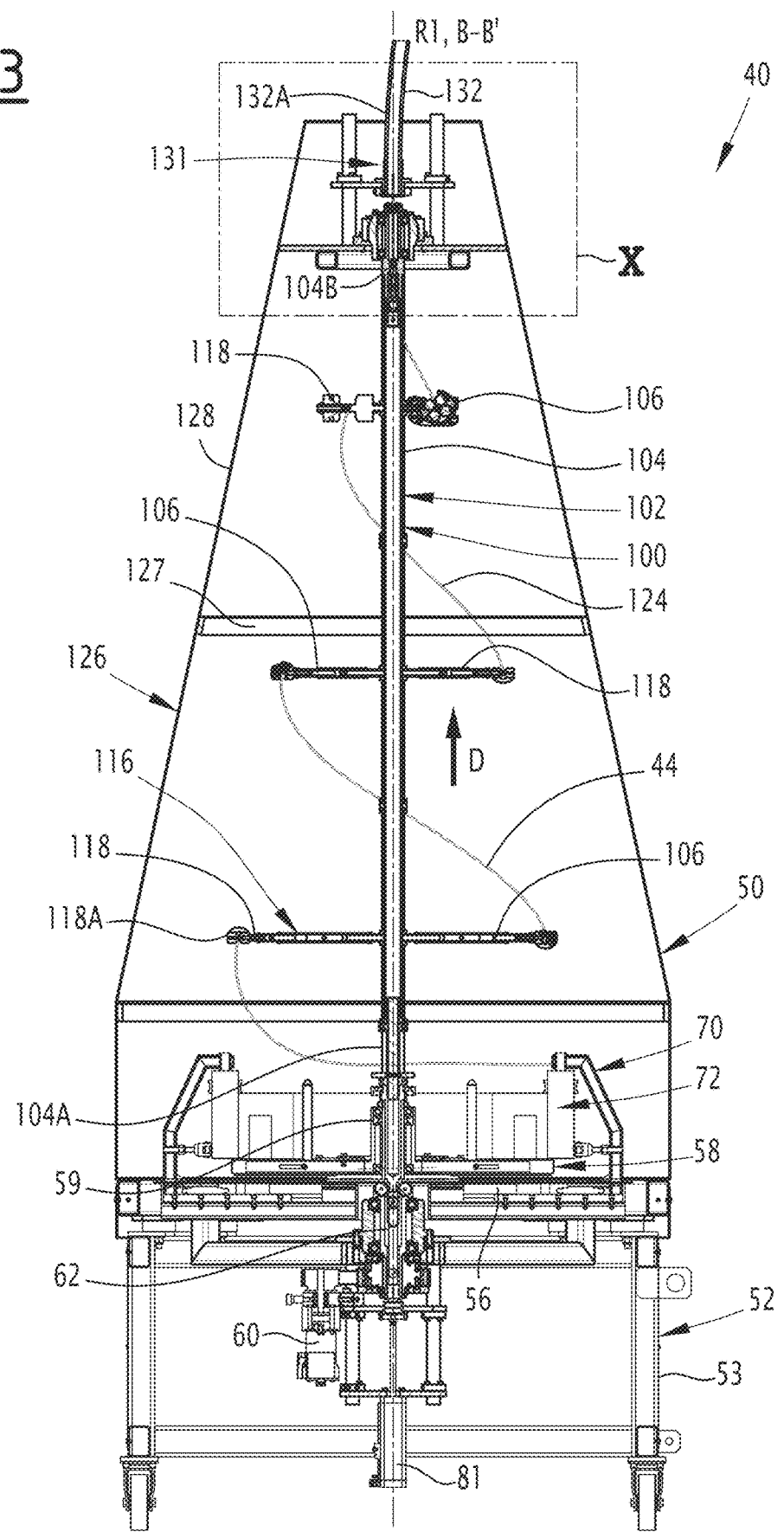
FIG. 3 is a cross-sectional view according to a vertical cross-section of the plane of the feed system of the manufacturing installation of FIGS. 1 and 2.

As illustrated in FIGS. 1 to 3, the support 52 comprises a box 53, mounted on wheels.

The support 52 is displaceable in a horizontal plane substantially parallel to the ground on which the box 53 rests. This allows the assembly comprising the rotation mechanism 56, the guide mechanism 100 and, where applicable, the protection mechanism 126 to be arranged relative to the manufacturing system 20.

As illustrated in the examples shown in FIGS. 1 and 2, the support 52 also comprises a post 54 for holding the guide device 130.

In particular, the holding post 54 is arranged between, on the one hand, the assembly comprising the rotation mechanism 56, the guide mechanism 100 and, if applicable, the protection mechanism 126, and, on the other hand, the manufacturing system 20.

As visible in the example in FIG. 2, the holding post 54 is mounted on the box 53. Advantageously, the holding post 54 is also mounted about a principal axis of the robot 30. This allows to facilitate the displacement of the feed system 40 essentially in rotation about this principal axis of the robot 30.

The holding post 54 comprises an element 55 for holding a guide sheath 132 of the guide device 130.

As illustrated in FIGS. 1 and 2, the holding element 55 comprises, for example, a post and at least one pulley, the at least one pulley comprising a sheave configured to cooperate with the guide sheath 132.

The rotation mechanism 56 is mounted on the support 52.

The rotation mechanism 56 is configured to drive the spool 42 in rotation about the principal axis of rotation R1. According to the example shown in FIGS. 1 to 11, the principal axis of rotation R1 is coincident with the spool axis A-A'.

In particular, the rotation mechanism 56 is configured to jointly drive the spool 42 and the guide mechanism 100 in rotation about the principal axis of rotation R1.

Advantageously, the rotation mechanism 56 comprises the plate 58.

Figure 6:
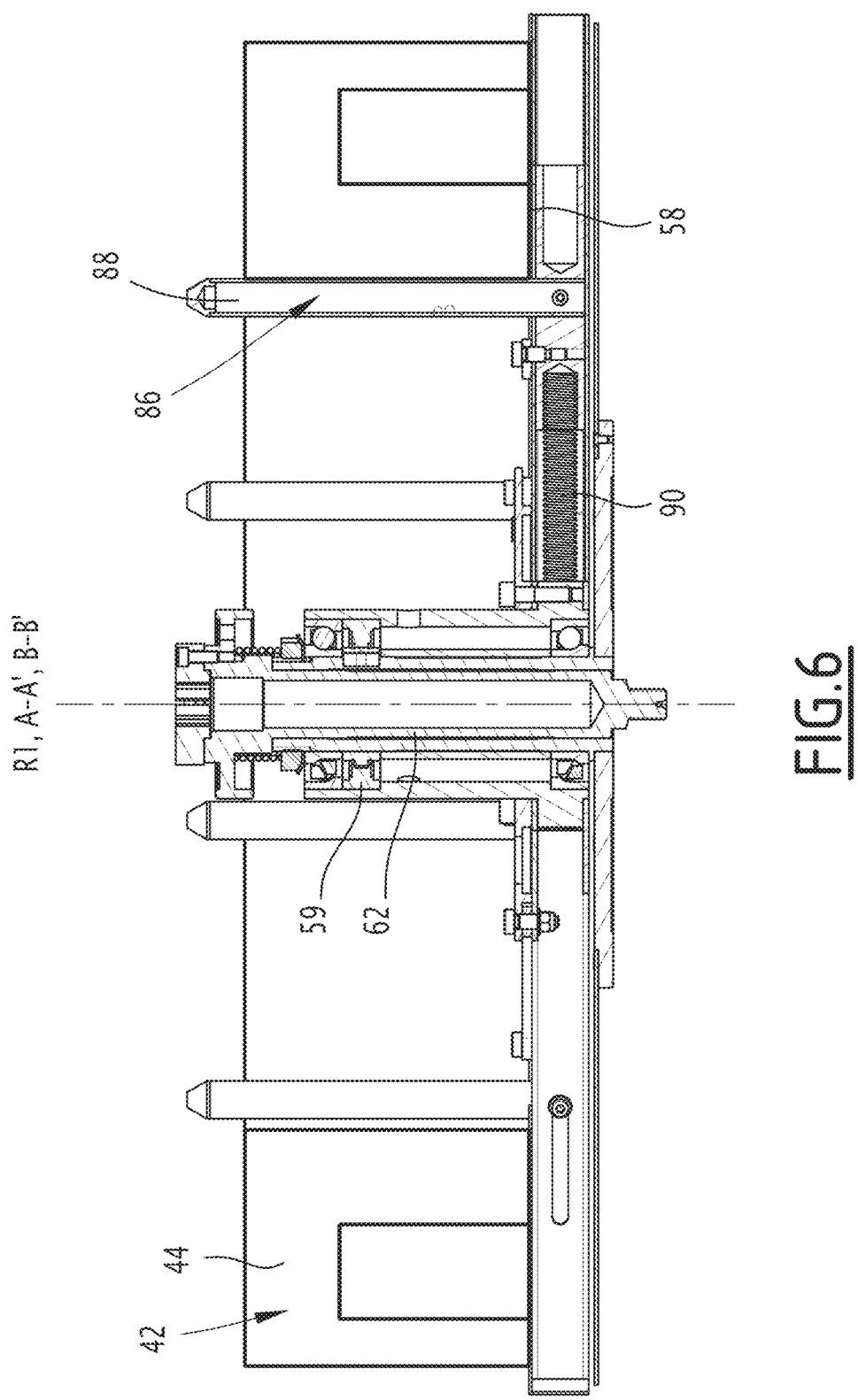
FIG. 6 is a cross-sectional view according to the cross-section of the plane VI-VI of one part of the portion of the rotary unwinding device of FIG. 5.

Even more advantageously, the rotation mechanism 56 further comprises:
- a motor 60;
- a shaft 62; and
- a freewheel 59 (FIGS. 3 and 6).

Even more advantageously, the rotation mechanism 56 also comprises the means 70 for confining the spool 42.

The plate 58 is movable in rotation about the principal axis of rotation R1.

Figure 4:
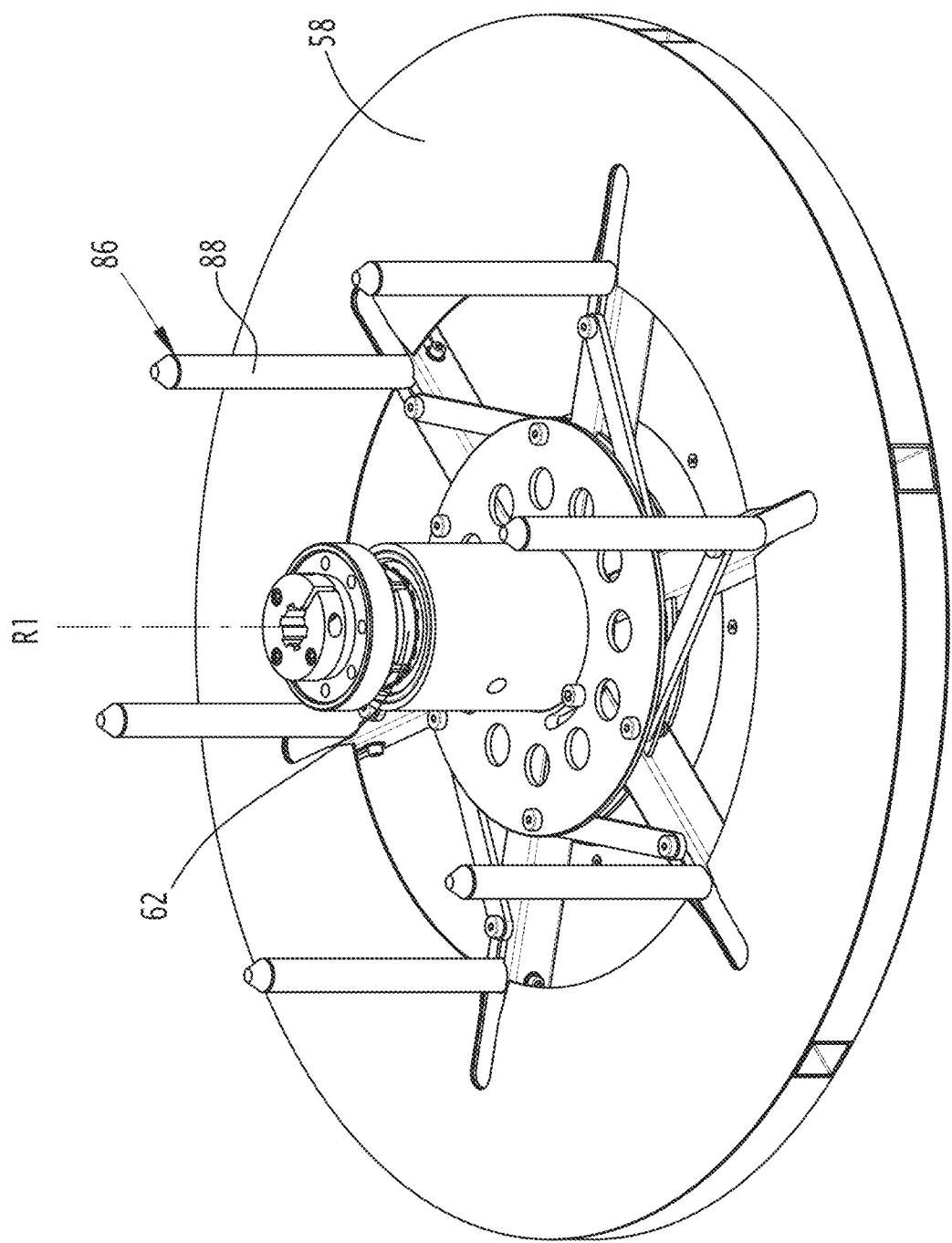
FIG. 4 is a top perspective view of a portion of the rotary unwinding device of the feed system of FIG. 3.
Figure 5:
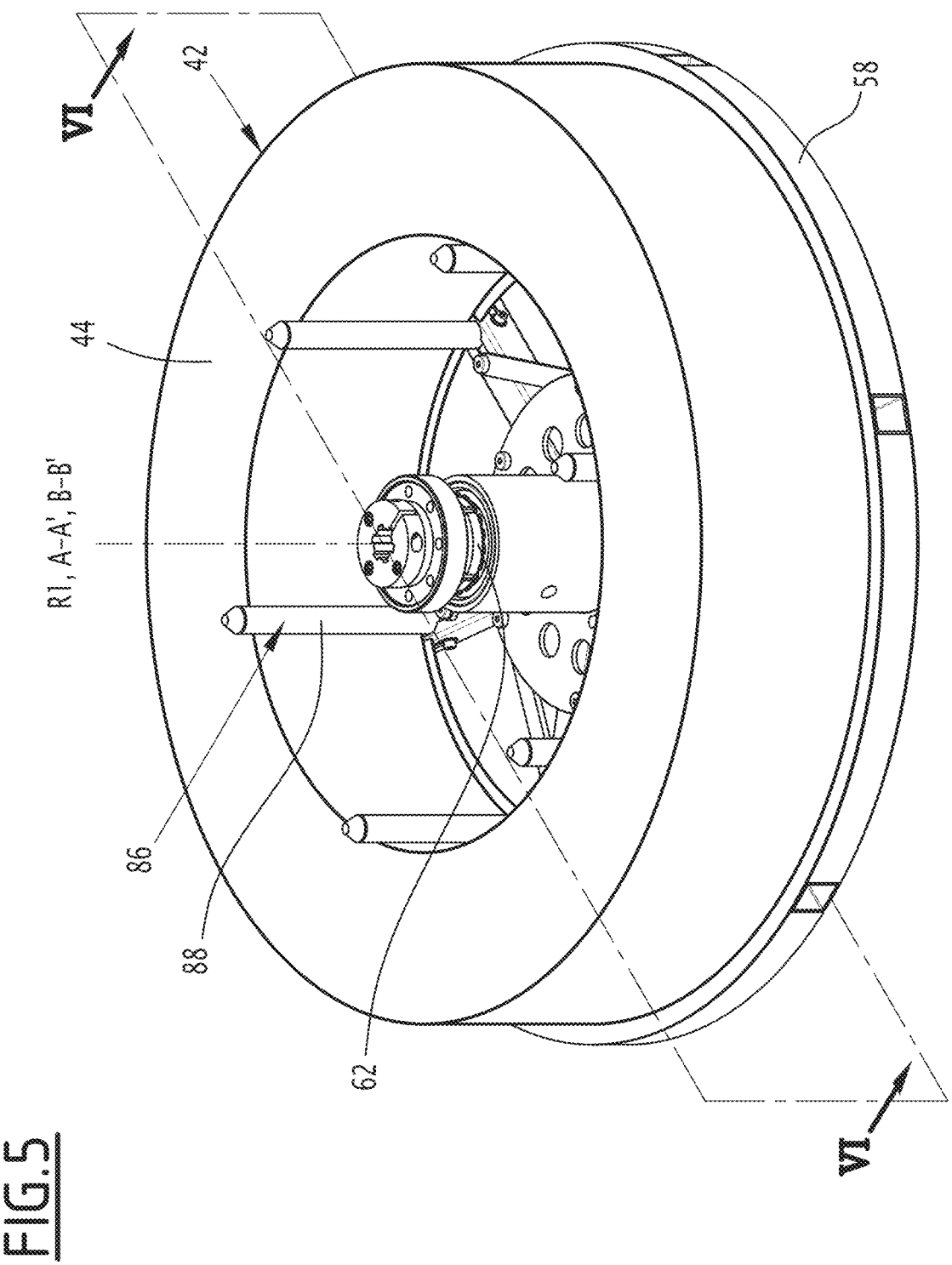
FIG. 5 is a top perspective view of the portion of the rotary unwinding device of FIG. 4, on which a spool of manufacturing material wire is arranged.

For example, as illustrated in FIGS. 4 and 5, the plate 58 is an annular plate extending in a plane substantially perpendicular to the principal axis of rotation R1.

The plate 58 is mounted on the shaft 62 by means of the freewheel 59.

The plate 58 is configured to be driven in rotation by the shaft 62 by means of the freewheel 59.

The shaft 62 extends substantially according to the principal axis of rotation R1 and is configured to be driven in rotation by the motor 60 about the principal axis of rotation R1.

Advantageously, the shaft 62 comprises two parts removably mounted on each other. The two parts of the shaft 62 are separable to allow the spool 42 to be mounted on the plate 58.

The rotation of the shaft 62 about the principal axis of rotation R1 drives the plate 58 in rotation about the principal axis of rotation R1 via the freewheel 59.

For example, the speed of rotation of the plate 58 about the principal axis of rotation R1, generated by the motor 60 and by means of the freewheel 59, is between 500 rpm and 5,000 rpm.

The freewheel 59 allows an additional rotation of the plate 58 about the principal axis of rotation R1 relative to the shaft 62.

The feeding of the manufacturing material wire 44 unwound by the feed device 27 drives the additional rotation of the plate 58 about the principal axis of rotation R1 relative to the shaft 62, and the unwinding of the manufacturing material wire 44 from the spool 42.

The additional speed of rotation of the plate 58 about the principal axis of rotation R1 relative to the shaft 62 is, for example, between 0 rpm and 100 rpm, in particular between 0 rpm and 5 rpm.

The containment means 70 is mounted on the shaft 62, in particular directly on the shaft 62, so as to be movable in rotation about the principal axis of rotation R1 together with the shaft 62.

The containment means 70 comprises an apparatus 72 for containing the spool 42.

Even more advantageously, the confinement means 70 further comprises a constraint apparatus 80.

Even more advantageously, the containment means 70 further comprises a complementary constraint apparatus 86.

The containment apparatus 72 comprises at least one containment element 75.

Figure 7:
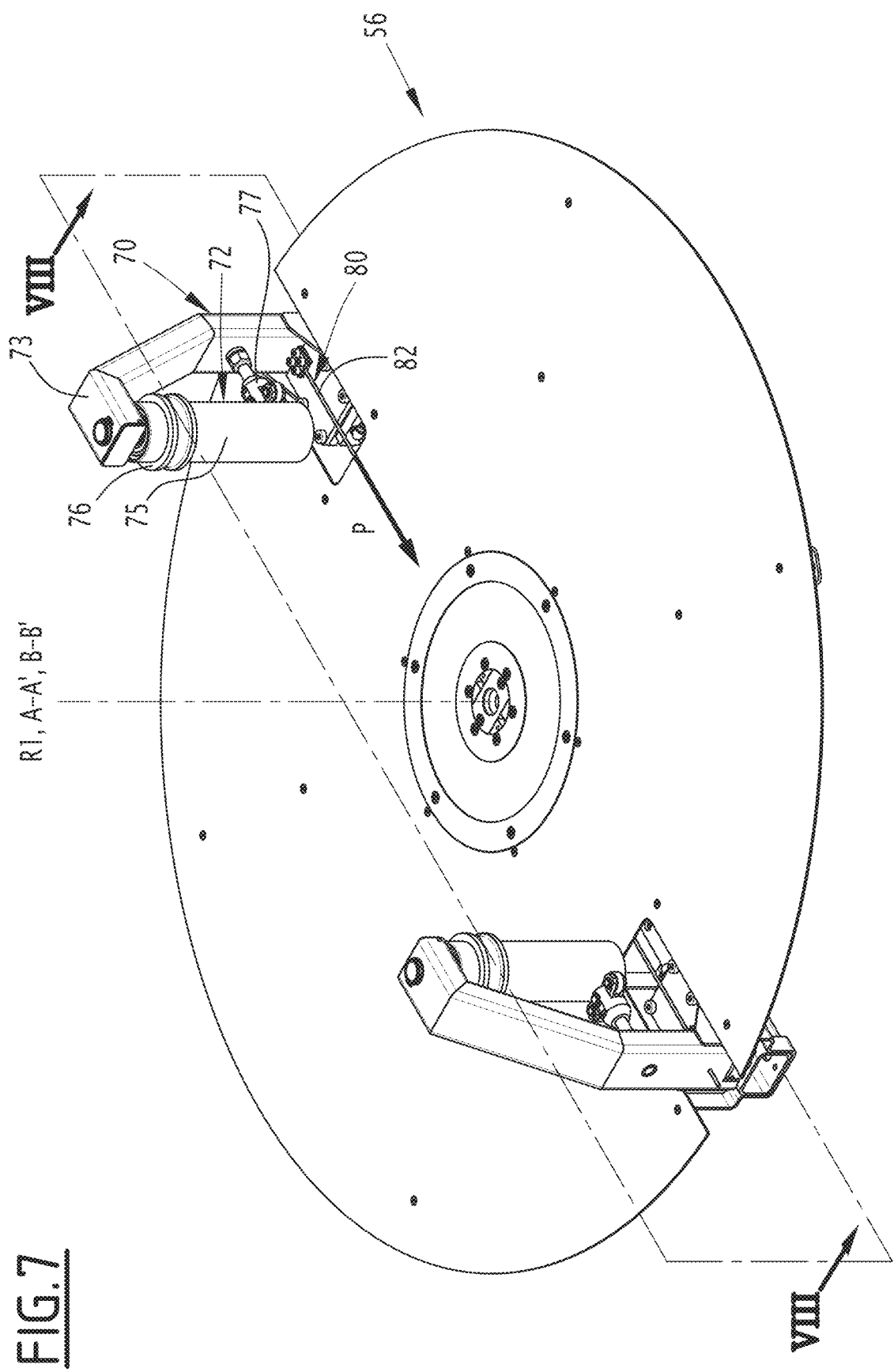
FIG. 7 is a top perspective view of a portion of the rotary unwinding device of the feed system of FIG. 3, including, in particular, part of the spool containment means.

As illustrated in FIGS. 3 and 7, the containment apparatus 72 comprises, for example, two containment elements 75 arranged in a symmetrical manner about the principal axis of rotation R1.

Figure 8:
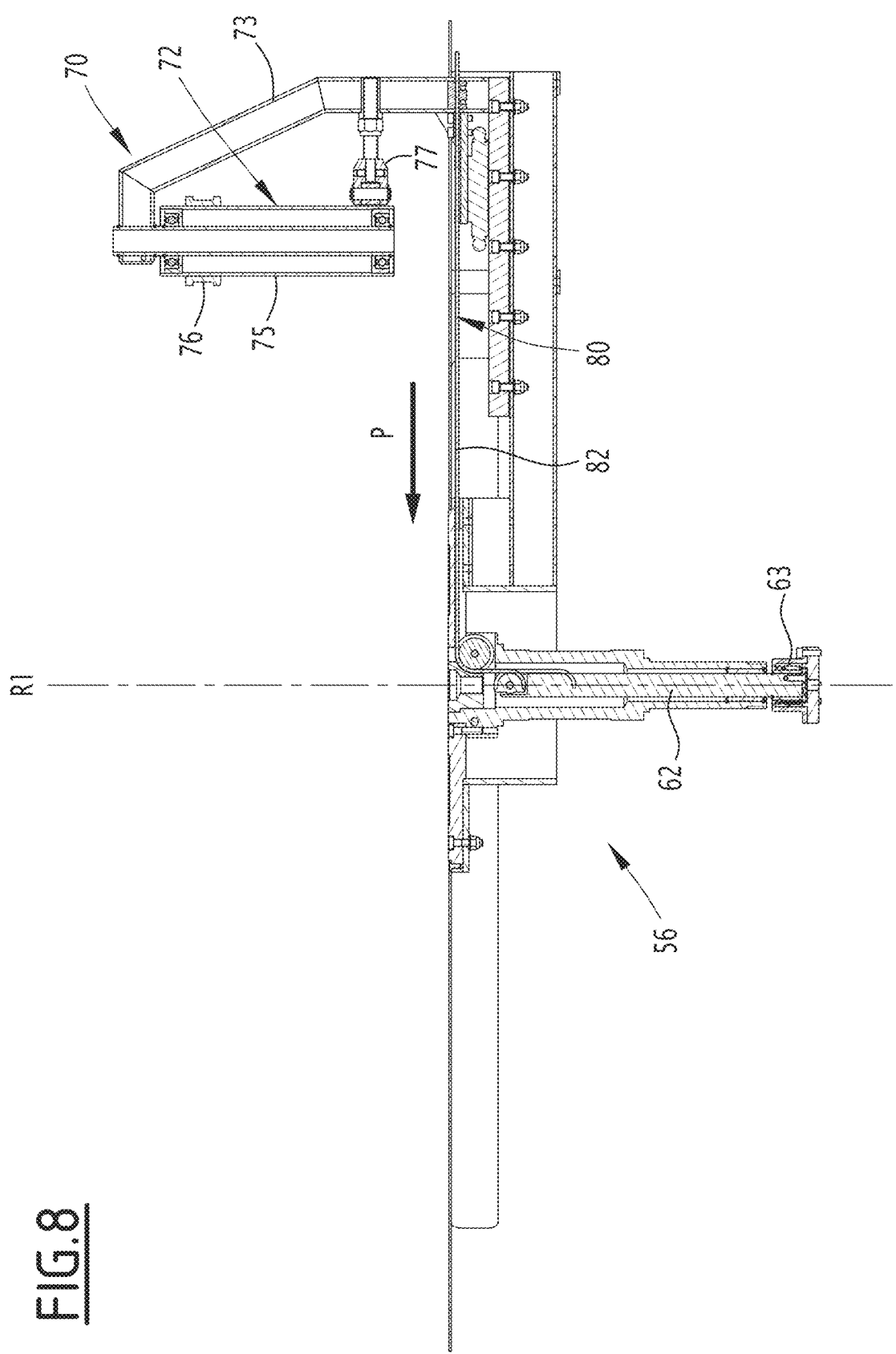
FIG. 8 is a cross-sectional view according to the cross-section of the plane VIII-VIII of part of the portion of the rotary unwinding device shown in FIG. 7.

For example, the at least one containment element 75 is a roller (as illustrated in FIGS. 3, 7 and 8) or a shoe.

As illustrated in FIGS. 3, 7 and 8, the at least one containment element is movable in translation in a radial direction P substantially orthogonal to the principal axis of rotation R1 between:
- a strong bearing position in which the at least one containment element 75 bears against the outer circumference of the spool 42, so as to secure the spool 42 and the plate 58 to the shaft 62 in rotation; and
- a weak bearing position in which the at least one containment element 75 bears against the outer circumference of the spool so as to allow the additional rotation of the plate 58 about the principal axis of rotation R1 relative to the shaft 62, while confining the spool 42 radially relative to the principal axis of rotation R1.

In particular, in the strong bearing position, the force exerted by the at least one confinement element 75 on the outer circumference of the spool 42 is greater than the force exerted by the at least one confinement element 75 on the outer circumference of the spool 42 in the weak bearing position.

The radial confinement of the spool 42 allows to ensure optimally oriented unwinding relative to the guide mechanism 100, in particular relative to the guide arms 106 of the guide mechanism 100.

As illustrated in the example in FIGS. 7 and 8, the containment apparatus 72 further comprises, for each containment element 75:
- a foot 73, the corresponding containment element 75 being mounted on the foot 73;
- an annular element 76 projecting radially from an outer peripheral surface of the containment element 75; and
- a counter-bearing element 77.

Advantageously, the foot 73 is integral with the corresponding containment element 75 in translation according to the radial direction P.

The containment element 75 presents an outer peripheral surface intended to be in contact with the spool 42, in particular the outer circumference of the spool 42, in both the strong and weak bearing positions.

The annular element 76 is configured to act as a high stop for the manufacturing material wire 44 leaving the spool 42.

For example, the annular element 76 extends over the entire outer circumference of the containment element 75.

The counter-bearing element 77 projects over the foot 73 to the containment element 75. The counter-bearing element 77 is arranged so that the containment element 75 is constrained between the spool 42 and the counter-bearing element 77, particularly when the containment element 75 is in the strong bearing position. This allows to optimize the contact between the outer circumference of the spool 42 and the containment element 75, particularly in the strong bearing position, avoiding excessive bending of the containment element 75.

The constraining apparatus 80 is configured to radially constrain the at least one confining element 75 against the spool 42 in the direction of the principal axis of rotation R1.

As illustrated in FIGS. 3, 7 and 8, the constraint apparatus 80 comprises an actuator 81, a cable 82 and a rotary decoupler 63.

The actuator 81 is integral with the support 52 and mounted on the shaft 62.

The cable 82 connects the at least one containment element 75, in particular the foot 73, and the actuator 81.

The rotary decoupler 63 allows the actuator 81 to be decoupled in rotation, from the shaft 62.

The actuator is configured to pull the at least one containment element 75, in particular the foot 73, by means of the cable 82 radially in the direction of the principal rotation axis R1 according to the radial direction P.

With reference to FIGS. 3 to 6, the complementary constraint apparatus 86 is configured to radially constrain the spool 42 in the direction of the at least one containment element 75.

In particular, the complementary constraint apparatus 86 allows to increase the bearing of the containment element 75 on the outer circumference of the spool 42, especially in the strong bearing position.

In particular, the complementary constraint apparatus 86 comprises a plurality of rods 88 extending according to a direction substantially parallel to the principal axis of rotation R1, and a plurality of constraining elements 90.

As visible in the example in FIGS. 4 and 5, the complementary constraint apparatus 86 comprises notably six rods 88 distributed uniformly opposite the inner circumference of the spool 42 when the spool 42 is mounted on the plate 58.

For example, as illustrated in FIGS. 3 to 6, the rods 88 are arranged about the shaft 62 of the rotation mechanism 56.

The rods 88 are movably mounted in translation on the rotation mechanism 56 according to the radial direction P.

The rods 88 are intended to bear on the inner circumference of the spool 42.

As illustrated in FIG. 6, the constraint elements 90 are compression springs integral with the plate 58, configured to constrain the rods 88 toward the inner circumference of the spool 42.

The guide mechanism 100 is configured to guide the unwound manufacturing material wire 44 up to the guide device 130, in particular up to the guide sheath 132 of the guide device 130, in particular up to a tubular passage 134 of the guide sheath 132 of the guide device 130, and is configured to constrain the unwound manufacturing material wire 44 so that the unwound manufacturing material wire 44 rotates about its neutral fiber at the inlet to the guide device 130.

As illustrated in FIG. 3, the manufacturing material wire 44 is fed from the spool 42 to the guide device 130 according to a general direction D substantially parallel to the principal axis of rotation R1.

In particular, as can be seen in FIGS. 1 and 3, the guide mechanism 100 is configured so that the trajectory of the unwound manufacturing material wire 44 describes, between the spool 42 and an inlet 131 of the guide device 130, substantially a conical (or spiral) helix trajectory the cone of which has its apex facing the inlet 131 of the guide device 130 (FIG. 10), in particular facing a proximal end 132A of the guide sheath 132.

The guide mechanism 100 comprises a central frame 102 mounted on the rotation mechanism 56, in particular on the shaft 62.

Advantageously, as illustrated in FIG. 3, the central frame 102 comprises a central column 104 and a plurality of guide arms 106 mounted on the central column 104.

Even more advantageously, the central frame 102 also comprises a dynamic balancing means 116. The dynamic balancing means 116 is also an aerodynamic balancing means.

The central column 104 extends according to a column axis B-B' coincident with the principal axis of rotation R1.

Figure 10:
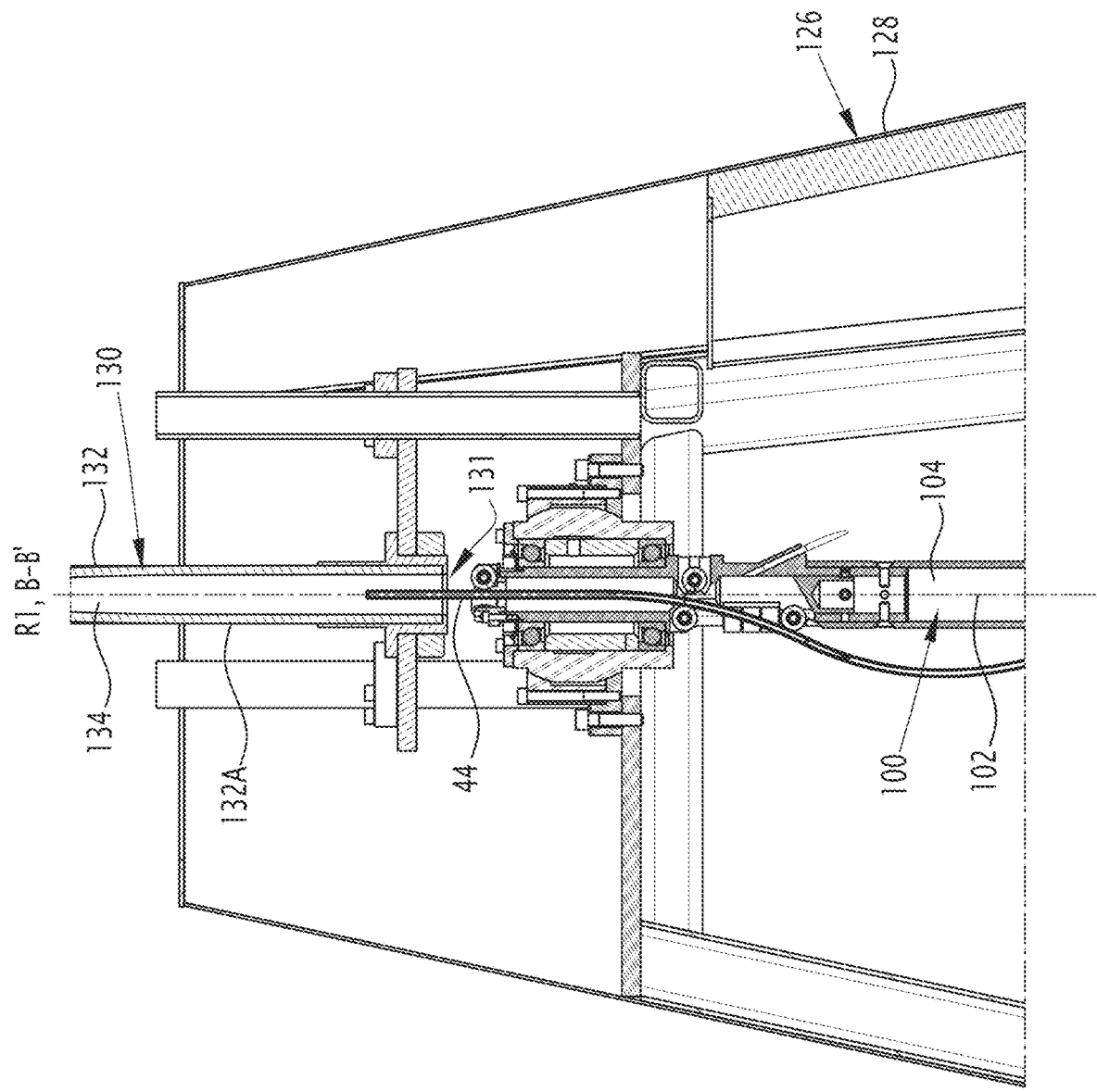
FIG. 10 is an enlarged view of a detail X of FIG. 3.
Figure 11:
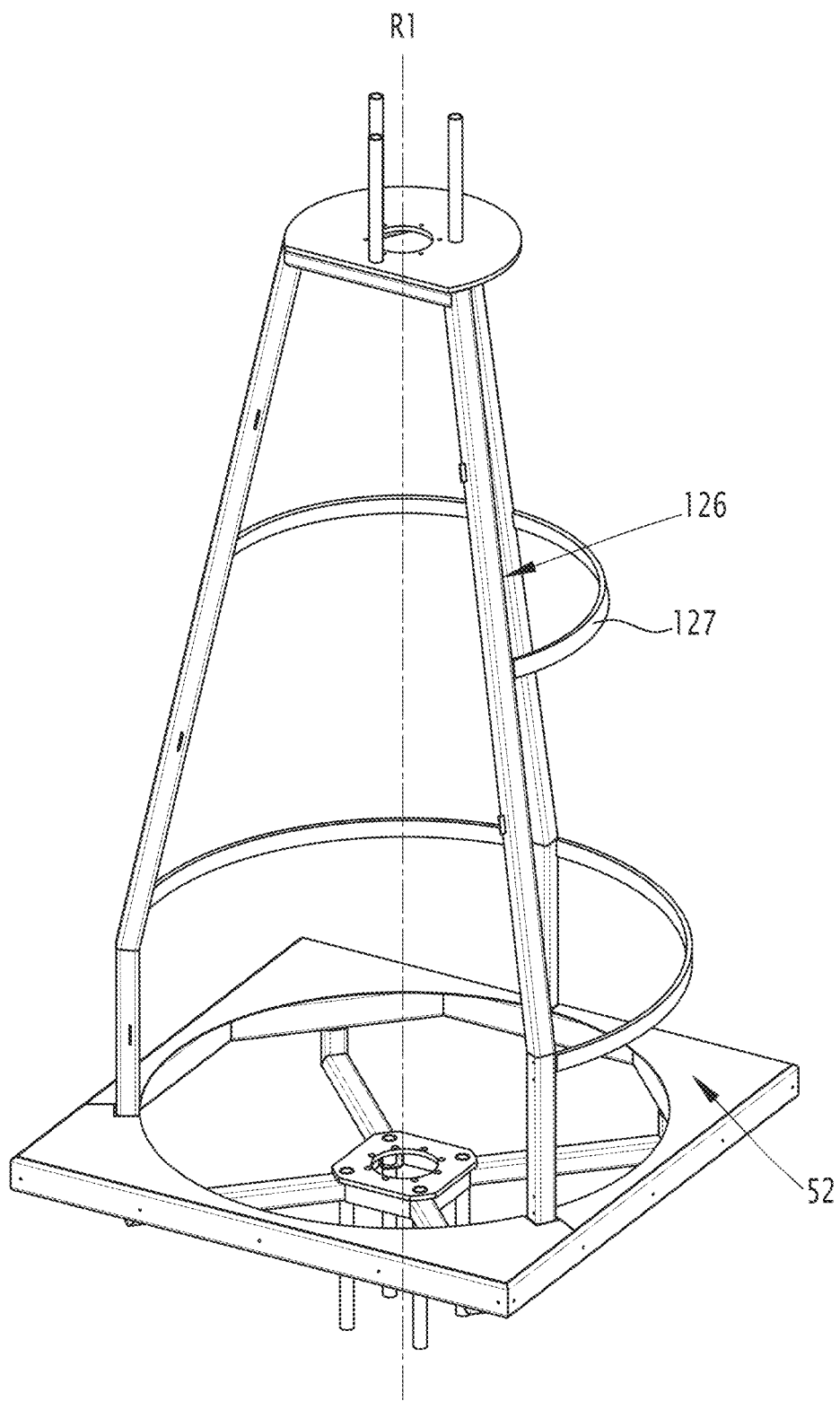
FIG. 11 is a top perspective view of a part of the rotary unwinding device of the feed system of FIG. 3.

With reference to FIGS. 3 and 10, the central column 104 extends in particular from a proximal end 104A mounted on the rotation mechanism 56, in particular on the shaft 62, to a distal end 104B mounted opposite the proximal end 132A of the guide sheath 132.

The central column 104 is driven in rotation about the principal axis of rotation R1 by the rotation mechanism 56, in particular by the shaft 62.

The guide arms 106 are mounted on the central column 104 so as to be distributed along the column axis B-B'.

Each guide arm 106 extends substantially perpendicular to the column axis B-B' from the central column 104 to a radial end 106A.

Figure 9:
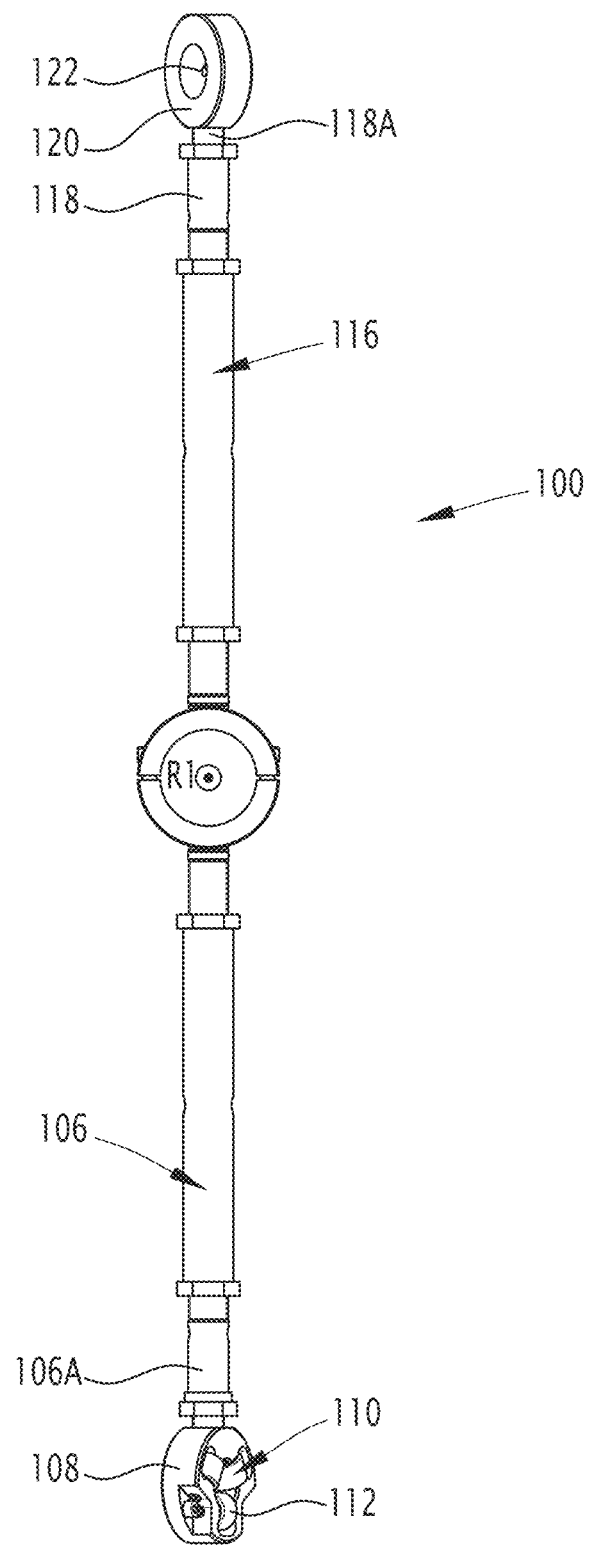
FIG. 9 is a side view of a part of the guide mechanism for the unwound manufacturing material wire of the rotary unwinding device of the feed system of FIG. 3.

With reference to FIGS. 3 and 9, each guide arm 106 comprises a tubular guide element 108. In particular, the tubular guide element 108 is arranged at the radial end 106A of the corresponding guide arm 106.

Advantageously, the tubular guide element 108 delimits an orifice 110 for guiding the unwound manufacturing material wire 44, through which the unwound manufacturing material wire is intended to extend and in particular to pass as it is fed to the guide device 130.

Even more advantageously, the tubular guide element 108 comprises at least one rolling part 112 extending substantially into the guide orifice 110 and intended to cooperate with the unwound manufacturing material wire 44 as it passes through the guide orifice 110. According to the example illustrated in FIG. 9, the tubular guide element 108 comprises three rolling parts 112. The rolling parts 112 allow to facilitate the passage of the unwound manufacturing material wire 44 through the guide orifice 110 and guide the trajectory of the wire 44 in a precise manner.

The at least one rolling element 112 is, for example, a roller or a ball.

With reference to FIGS. 3 and 9, the dynamic balancing means 116 is mounted on the central column 104.

The dynamic balancing means 116 is arranged so that the masses of the dynamic balancing means 116, the guide arms 106 and the unwound manufacturing material wire 44 extending between the spool 42 and the sheath 132, are distributed in a substantially symmetrical manner about the principal axis of rotation R1.

In particular, with reference to FIGS. 3 and 9, the dynamic balancing means 116 comprises a plurality of balancing arms 118 and a balancing wire 124.

The balancing arms 118 are mounted on the central column 104 so as to be distributed along the column axis B-B'.

Each balancing arm 118 extends substantially perpendicular to the column axis B-B' from the central column 104 to a radial end 118A.

As illustrated in the examples in FIGS. 3 and 9, each balancing arm 118 extends from the central column 104 facing a corresponding guide arm 106, according to the direction of extension but in an opposite direction to the corresponding guide arm 106. This allows dynamic balancing, but also aerodynamic.

Each balancing arm 118 comprises a tubular holding element 120. In particular, the tubular holding element 120 is arranged on the radial end 118A.

The tubular holding element 120 delimits a balancing wire 124 holding orifice 122 through which the balancing wire 124 extends.

The balancing wire 124 and the balancing arms 118, in particular the tubular holding elements 120, are arranged so that the mass of the balancing arms 118 and the balancing wire 124 is distributed symmetrically about the principal axis of rotation R1 relative to the mass of the guide arms 106 and the unwound manufacturing material wire 44 extending between the spool 42 and the sheath 132.

In particular, the guide mechanism 100 is configured so that the trajectory of the balancing wire 124 substantially describes a conical (or spiral) helix trajectory the cone of which has its apex facing the inlet 131 of the guide device 130, this trajectory being advantageously substantially symmetrical to the trajectory of the unwound manufacturing material wire 44 between the spool 42 and the inlet 131, relative to the principal axis of rotation R1.

With reference to FIGS. 1 to 3 and 11, the protection mechanism 126 comprises a framework 127 mounted on the support 52, a housing 128 mounted on the framework 127 and a removable cover 129 mounted on the housing 128.

The framework 127 is mounted on the support 52 and extends between the rotation mechanism 56 and the guide device 130, in particular the proximal end 132A of the guide sheath 132.

The housing 128 delimits, in particular with the support 52 and with the removable cover 129 when the latter is closed, an enclosure in which the rotation mechanism 56 and the guide mechanism 100 are arranged and in which the unwound manufacturing material wire 44 is intended to displace from the spool 42 toward the guide device 130.

For example, the housing 128 presents a generally truncated conical shape.

The removable cover 129 is displaceable between an open position (illustrated in FIGS. 1 and 2) in which the removable cover 129 gives access to the enclosure from the outside, and a closed (non-illustrated) position in which access to the enclosure is prevented. In the closed position, the operation for unwinding the wire from the spool 42 to the guide device 130 is protected from any harmful interaction with elements external to the feed system 40.

For example, the assembly comprising the housing 128 and the removable cover 129 presents, when the removable cover 129 is in its closed position, a generally conical shape.

The guide device 130 is configured to guide the unwound manufacturing material wire 44 from the rotary unwinding device 50 to the manufacturing system 20.

As illustrated in the example in FIGS. 1 to 3 and 10, the guide device 130 comprises a guide sheath 132.

The guide device 130 comprises an inlet 131. The inlet 131 corresponds, for example, to a proximal end 132A of the guide sheath 132.

The guide sheath 132 extends from the proximal end 132A, connected to the rotary unwinding device 50, to a distal end 132B connected to the manufacturing system 20.

Advantageously, the guide sheath 132, in particular the proximal end 132A, is mounted on the support 52, in particular by means of the protection mechanism 126. As illustrated in the example in FIGS. 3 and 10, the guide sheath 132, in particular the proximal end 132A, is mounted on the framework 127 of the protection mechanism 126.

The guide sheath 132 is configured to guide the unwound manufacturing material wire 44 from the rotary unwinding device 50 to the manufacturing system 20.

In particular, the guide sheath 132 delimits a tubular passage 134 in which the material wire 44 is intended to extend and displace, both in rotation and translation.

Advantageously, the guide sheath 132 presents a circular cross-section.

For example, the guide sheath 132 presents an internal diameter of between 12 mm and 26 mm.

As illustrated in FIGS. 1 and 2, the guide sheath 132 extends between the proximal end 132A and the distal end 132B according to a curved trajectory.

For example, the trajectory of the guide sheath 132 presents a minimum radius of curvature of between 1 m and 2 m.

FIGS. 1 and 2 illustrate several possible positions for the guide sheath 132, depending on the position of the support 52 and depending on the position of at least one arm 32 of the robot 30. A first position of the guide sheath 132 is represented as a solid line, and two alternative positions of the guide sheath 132 are represented as dotted lines in FIGS. 1 and 2.

Advantageously, the guide device 130 also comprises a mechanism for cooling the guide sheath 132 (not shown).

For example, the cooling mechanism comprises a means for circulating coolant, configured to circulate coolant in contact with the guide sheath 132. For example, the coolant circulation means is configured to circulate the coolant in the guide sheath 132, in particular in the tubular passage 134 about the unwound manufacturing material wire 44, or about the guide sheath 132.

For example, the coolant is air.

The means for circulating the coolant comprises, for example, a compressor.

Figure 12:
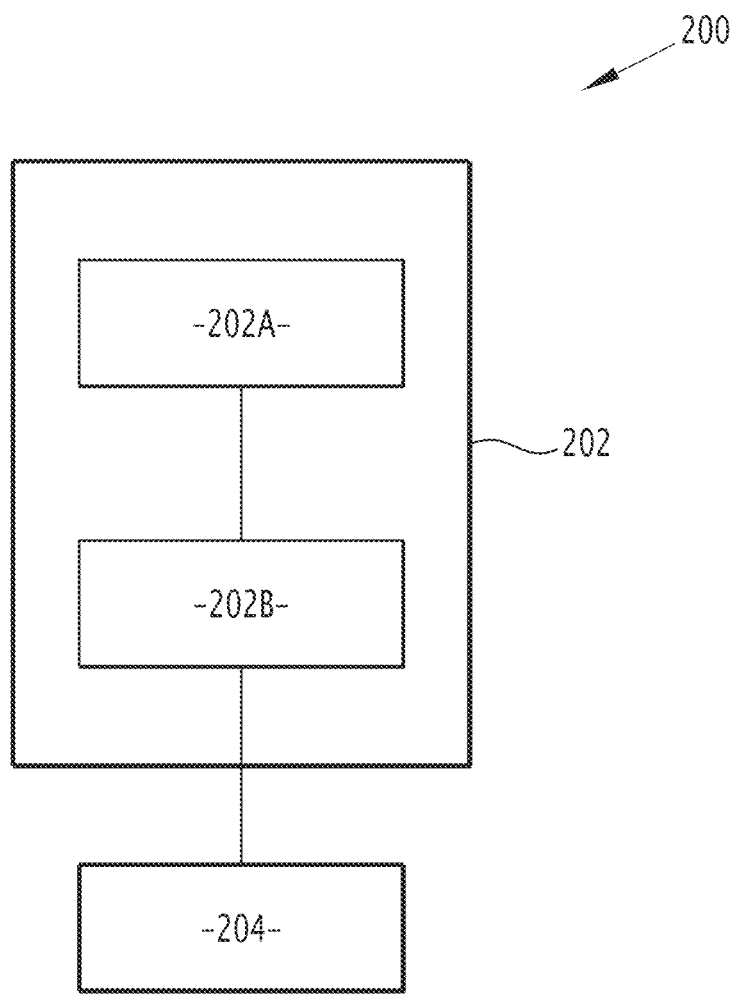
FIG. 12 is a schematic representation of the manufacturing method according to the present disclosure.

In the following and with reference to FIG. 12, a method 200 for manufacturing a manufactured object using the manufacturing system 10 is described.

The manufacturing method 200 comprises a step 202 of feeding the manufacturing system 20 with manufacturing material via the feed system 40.

The feed step comprises a sub-step 202A of unwinding the manufacturing material wire 44 from the spool 42 by the rotary unwinding device 50.

The unwinding sub-step 202A comprises rotating the spool 42 about the principal axis of rotation R1 and the rotation of the unwound manufacturing material wire 44 about its neutral fiber by the rotary unwinding device 50.

In particular, the rotation mechanism 56 jointly drives the spool 42 and the guide mechanism 100 in rotation about the principal axis of rotation R1. In particular, this allows the wire 44 to be turned about its neutral fiber at the distal end 104B of the central column 104 of the guide mechanism 100.

Advantageously, the sub-step 202A for unwinding the wire 44 further comprises feeding the unwound manufacturing material wire 44 from the spool 42 to the guide device 130 according to the general direction D in particular by feeding the unwound manufacturing material wire 44 by the feed device 27 of the manufacturing system 20.

Even more advantageously, the sub-step 202A for unwinding the wire 44 also comprises guiding the unwound manufacturing material wire 44 to the guide sheath 132 by the guide mechanism 100, in particular by progressively turning it about its neutral fiber.

For example, the guide mechanism 100 guides the wire 44 so that the trajectory of the unwound wire 44 substantially describes a conical helix trajectory, the apex of which faces the inlet 131 of the guide device 130.

In particular, when the wire 44 is guided by the mechanism 100, the unwound wire 44 extends through the guide orifices 110 delimited by the tubular guide elements 108 of the guide arms 106.

In particular, the wire 44 cooperates with the at least one rolling part 112 of each tubular guide element 108.

The feed step 202 further comprises a sub-step 202B for guiding the unwound manufacturing material wire 44 from the rotary unwinding device 50 to the manufacturing system 20 by means of the guide device 130, in particular by the guide sheath 132.

In particular, during the guide sub-step 202B, the material wire 44 extends and is displaced, both in rotation about its neutral fiber and in translation in the tubular passage 134 delimited by the guide sheath 132.

The method further comprises a step 204 of manufacturing the manufactured object by additive friction stir deposition from the manufacturing material by the manufacturing system 20.

In particular, the manufacturing step 204 comprises a sub-step of stirring the unwound manufacturing material wire 44 by the stirring pin 26 to manufacture the manufactured object.

In particular, in parallel with the sub-step of stirring the wire 44, the manufacturing step further comprises a sub-step of feeding the manufacturing material wire 44 by the feed device 27.

Optionally, before the stirring sub-step, the manufacturing step comprises a sub-step of straightening the unwound manufacturing material wire 44 by the straightener 28. In particular, during the straightening sub-step, the straightener 28 straightens the curvature of the unwound manufacturing material wire 44 towards 0.

According to one alternative, not illustrated, the guide mechanism 100 comprises at least one annular guide element mounted on the inner circumference of the housing 128 or on the framework 127.

The at least one annular guide element comprises a radial inner bearing surface for the unwound manufacturing material wire 44, on which the wire 44 is intended to bear against during its transit from the spool 42 to the guide device 130.

For example, the guide mechanism 100 comprises a plurality of annular guide elements distributed along the principal axis of rotation R1, arranged so that the wire 44 is constrained to describe substantially a conical helix path as mentioned above.

According to another alternative, not illustrated, the guide device 130 comprises at least one ball bushing arranged inside the guide sheath 132, in particular in the tubular passage 134.

The at least one ball bushing delimits a hollow inner tubular space in which the unwound manufacturing material wire 44 is intended to circulate. This allows the unwound manufacturing material wire 44 to be guided in rotation without friction in the tubular passage 134.

The at least one ball bushing is configured to reduce friction resulting from the movements in rotation and in translation of the unwound manufacturing material wire 44 relative to the guide sleeve 132.

Advantageously, the guide device 130 comprises a plurality of ball bushes arranged between different longitudinal sections of the guide sheath 132.

According to yet another alternative, not illustrated, the cooling mechanism comprises a flexible sealed pipe enveloping the guide sheath 132.

According to this alternative, the cooling mechanism further comprises an auxiliary coolant circulation means configured to circulate the auxiliary coolant, for example water, in an annular space delimited by the guide sheath 132 and the flexible conduit.

Figure 13:
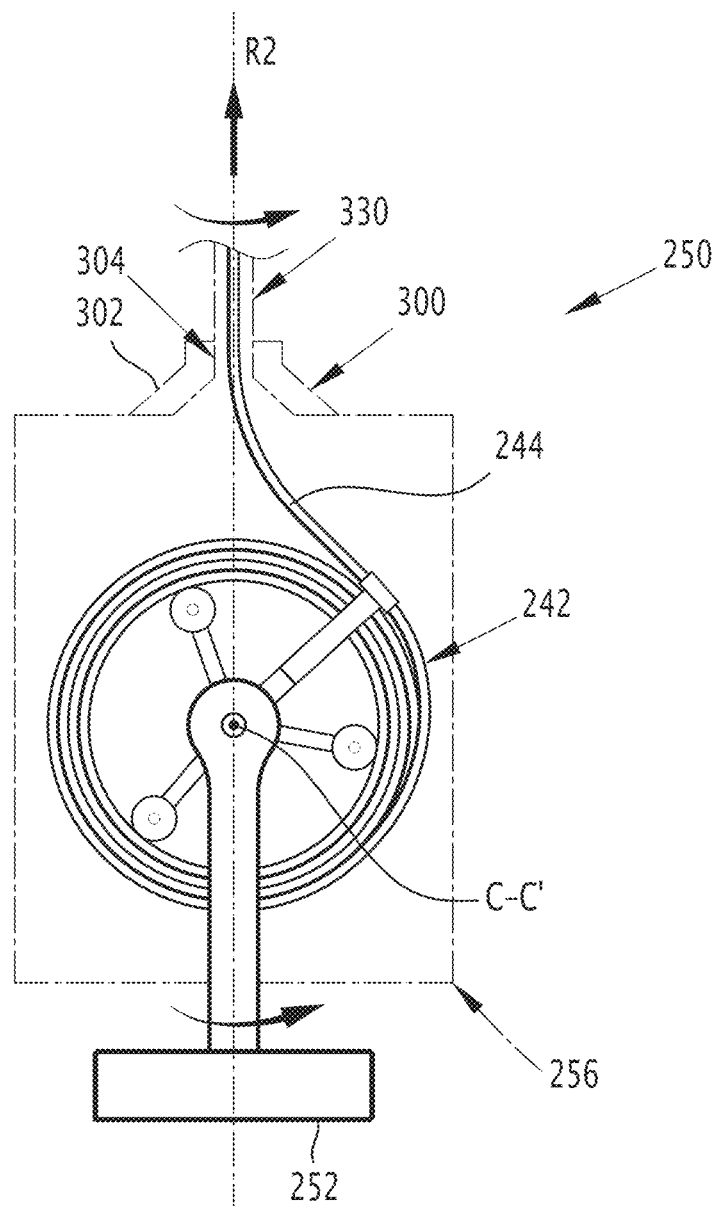
FIG. 13 is a simplified schematic representation of a portion of a manufacturing installation according to a second embodiment of the present disclosure.

According to a second embodiment illustrated in FIG. 13, the rotation mechanism 256 is configured to drive the spool 242 in rotation about a principal axis of rotation R2 substantially perpendicular to the spool axis 242 and passing through the center of the spool 242. In this embodiment, the spool 242 is, in addition, movable in rotation about the spool axis C-C' so that the feeding of the unwound manufacturing material wire 244, by the feed device drives the additional rotation of the spool 242 about the spool axis 242 and the unwinding of the manufacturing material wire 244 from the spool 242.

In the second embodiment, the guide mechanism 300 of the unwound manufacturing material wire comprises a guide funnel 302 including a tubular passage 304 extending substantially according to the principal axis of rotation R2 facing the inlet of the guide device 330. The tubular passage 304 is intended to channel the unwound manufacturing material wire 244 so that the wire 244 turns about its neutral fiber at the inlet to the guide device 330. Rotation of the spool 42 about the principal axis of rotation R2 is substantially perpendicular to the axis of the spool 42, in particular in conjunction with the cooperation of the wire 244 with the guide funnel 302, drives the unwound manufacturing material wire 244 to turn about its neutral fiber.

Figure 14:
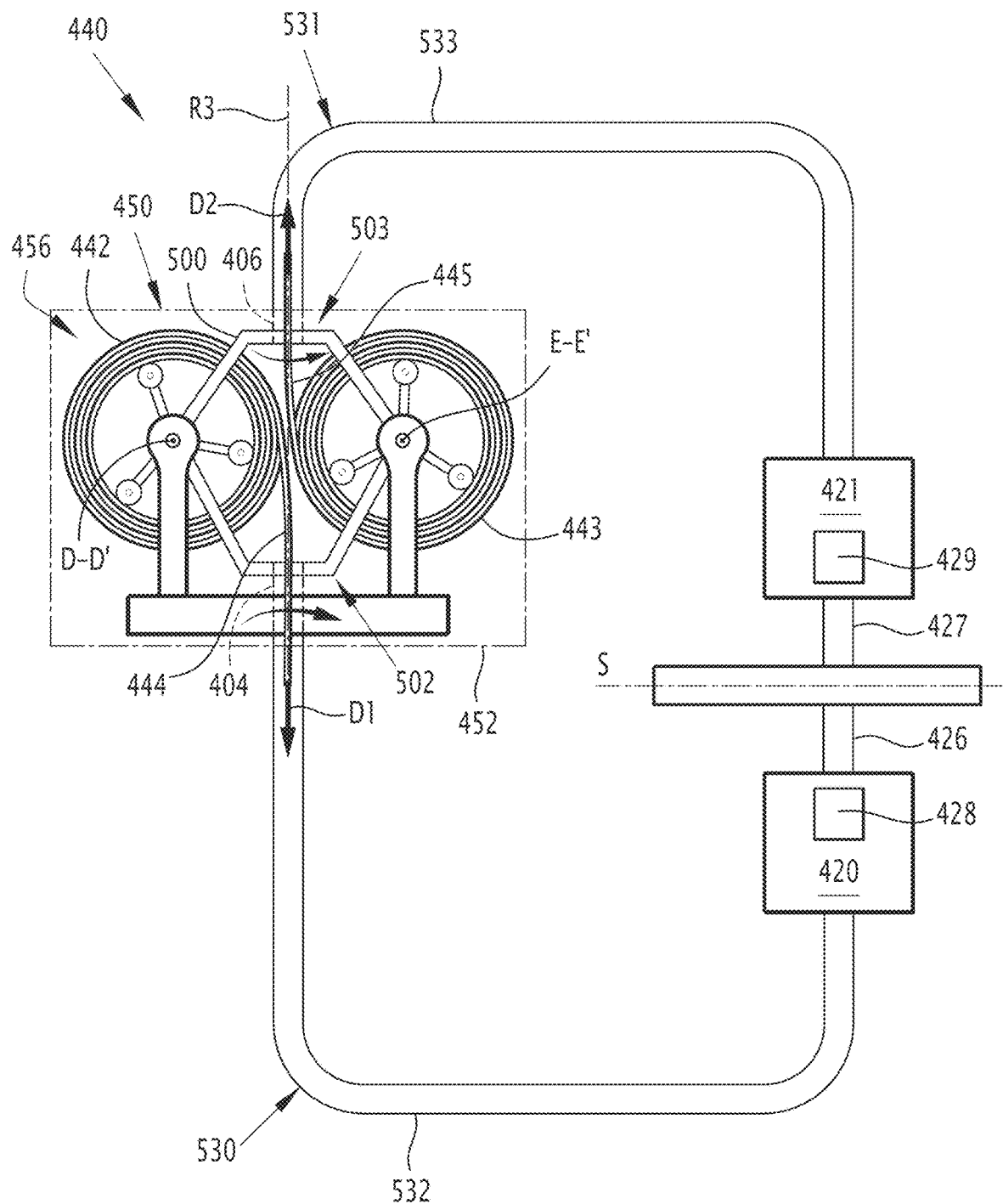
FIG. 14 is a simplified schematic representation of a portion of a manufacturing installation according to a third embodiment of the present disclosure.

According to a third embodiment illustrated in FIG. 14, the manufacturing installation 10 comprises a manufacturing system 420 and an auxiliary manufacturing system 421. The auxiliary manufacturing system 421 is configured to manufacture the manufactured object in conjunction with the manufacturing system 420 or an auxiliary manufactured object, by additive friction stir deposition from the manufacturing material.

In particular, the manufacturing system 420 comprises:
at least one motor;
an effector configured to be driven in rotation by the at least one motor;
a stirring pin 426 configured to be driven in rotation by the effector, the stirring pin 426 being intended to stir an unwound manufacturing material wire 444 from a spool 442 to manufacture the manufactured object, the stirring pin 426 being configured to be driven in rotation by the auxiliary effector;
a device 428 for feeding the unwound manufacturing material wire 444 from the spool 442, configured to displace the unwound manufacturing material wire 444 from the spool 442 toward the stirring pin 426.

The auxiliary manufacturing system 421 comprises in particular:
at least one auxiliary motor;
an auxiliary effector configured to be driven in rotation by the at least one auxiliary motor;
an auxiliary stirring pin 427 configured to be driven in rotation by the auxiliary effector, the auxiliary stirring pin 427 being intended to stir an unwound manufacturing material wire 445, from an auxiliary spool 443 to manufacture the manufactured object or auxiliary manufactured object, the auxiliary stirring pin 427 being configured to be driven in rotation by the auxiliary effector;
an auxiliary device 429 for feeding the unwound manufacturing material wire 445 from the auxiliary spool 443, configured to displace the unwound manufacturing material wire 445 from the auxiliary spool toward the auxiliary stirring pin 427.

In the third embodiment, the feed system 440 is configured to feed the manufacturing system 420 and the auxiliary manufacturing system 421 with manufacturing material.

The feed system 440 comprises the spool 442 of a manufacturing material wire, wound about a spool axis D-D' and the auxiliary spool 443 of a manufacturing material wire wound about an auxiliary spool axis E-E'. In particular, the spool axis D-D' and auxiliary spool axis E-E' are parallel.

The rotary unwinding device 450 is configured to unwind the manufacturing material wire from the spool 442 and the manufacturing material wire from the auxiliary spool 443.

The feed system 440 comprises a guide device 530 for guiding the unwound manufacturing material wire from the spool 442 from the rotary unwinding device 450 to the manufacturing system 420 and an auxiliary guide device 531 for guiding the unwound manufacturing material wire from the spool 443 from the rotary unwinding device 450 to the auxiliary manufacturing system 421.

The guide device 530 comprises a guide sheath 532 extending from a proximal end connected to the rotary unwinding device 450 to a distal end connected to the manufacturing system 420.

The guide sheath 532 is configured to guide the unwound manufacturing material wire from the spool 442 from the rotary unwinding device 450 to the manufacturing system 420.

The auxiliary guide device 531 comprises an auxiliary guide sheath 533 extending from a proximal end connected to the rotary unwinding device 450 to a distal end connected to the auxiliary manufacturing system 421.

The auxiliary guide sheath 533 is configured to guide the unwound manufacturing material wire from the auxiliary spool 443 from the rotary unwinding device 450 to the auxiliary manufacturing system 421.

For example, the spool 442 and the auxiliary spool 443 are mounted on the rotation mechanism 456 so that the spool 442 and the auxiliary spool 443 extend in the same plane.

The rotation mechanism 456 is configured to drive the spool 442 and the auxiliary spool 443 jointly in rotation about a principal axis of rotation R3, the principal axis of rotation R3 extending substantially tangentially relative to the outer circumference of each of the spool 442 and the auxiliary spool 443.

The manufacturing material wire of the spool 442 is fed toward the guide device 530 according to a general direction D1.

The manufacturing material wire of the auxiliary spool 443 is fed toward the auxiliary guide 531 according to an auxiliary general direction D2, substantially opposite to the general direction D1. The general direction D1 and the auxiliary general direction D2 are substantially parallel to the principal axis of rotation R3 of the rotation mechanism 456.

In particular, the guide mechanism 500 is configured to guide the unwound manufacturing material wire 444 and the wire 445 to the guide device 530, respectively 531 and to constrain the wire 444 and the wire 445 so that the wires 444, 445 turn about their respective neutral fiber at the inlet of the guide device 530, respectively 531.

In particular, as illustrated in FIG. 14, the guide mechanism 500 is configured to guide and/or constrain the manufacturing material wire of the spool 442 and the manufacturing material wire of the auxiliary spool 443 so that they extend substantially along the principal axis of rotation R3 between the spool 442 and the guide device 530, respectively between the auxiliary spool 443 and the auxiliary guide device 531.

Unwinding of the wire from the spool 442 and the wire from the spool 443 is then achieved by additional rotations of the two spools 442 and 443 about their respective spool axes D-D' and E-E'.

Advantageously, in the third embodiment, the mechanism 500 for guiding the unwound manufacturing material wire comprises a first guide funnel 502 and a second guide funnel 503. The first guide funnel 502 includes a tubular passage 404 extending substantially according to the principal axis of rotation R3 facing the inlet of the guide device 530. The tubular passage 404 is intended to channel the unwound manufacturing material wire 444 so that the wire 444 turns about its neutral fiber at the inlet to the guide device 530. The second guide funnel 503 includes a tubular passage 406 extending substantially according to the principal axis of rotation R3 facing the inlet of the auxiliary guide device 531. The tubular passage 406 is intended to channel the unwound manufacturing material wire 445 so that the wire 445 turns about its neutral fiber at the inlet to the auxiliary guide device 531. The rotation of the spools 442 and 443 about the principal axis of rotation R3, which is notably substantially perpendicular to the plane comprising the axes D-D' and E-E', in particular in conjunction with the cooperation of the wires 444 and 445 with the guide funnels 502, 503, drives the unwound manufacturing material wires 444 and 445 in rotation about their respective neutral fiber.

Advantageously, the manufacturing system 420 and the auxiliary manufacturing system 421 are arranged so that the stirring pin 426 and the auxiliary stirring pin 427 are arranged symmetrically relative to a plane of symmetry S, so that the force vectors exerted respectively by the stirring pin 426 and by the auxiliary stirring pin 427 are of substantially equal norm but of opposite direction, and so that the manufacturing material of the spool 442 and the manufacturing material of the auxiliary spool 443 are stirred and fed according to the respective symmetrical trajectories. This allows to obtain, a total component of the forces exerted by the stirring pin 426 and the auxiliary stirring pin 427 which is substantially reduced, while the material is fed and stirred according to the symmetrical trajectories, in particular, relative to the plane of symmetry S.

Even more advantageously, the stirring pin 426 and the auxiliary stirring pin 427 are fed with the same quantity of manufacturing material per unit of time.

For example, the stirring pin 426 and the auxiliary stirring pin 427 are intended to manufacture two opposite portions of a manufactured object extending substantially according to the plane of symmetry S. Alternatively, the stirring pin 426 and the auxiliary stirring pin 427 are intended to manufacture two manufactured objects arranged symmetrically against each other relative to the plane of symmetry S.

The manufacturing system 10 according to the present disclosure is simple, fast and efficient. It also presents fewer risks for an operator intending to interact with it and leads to the manufacture of a manufactured object of superior quality.

Indeed, the spools 42 of manufacturing material are easy to manufacture, store and transport.

Thanks to the use of these spools, the manufacturing material is consumed in a continuous manner, requiring no operator monitoring for the feed of manufacturing material. The manufacture of the object is, therefore, facilitated and the quality of the finished product is improved.

In addition, the combined use of the rotation mechanism 56 and the guide mechanism 100 allow to transform a rotation of the spool 42 into a rotation of the wire 44 on itself at high speed, and to generate an unwinding of the wire 44 at a relatively lower speed, depending on the needs of the manufacturing system 20.

The guiding of the wire 44 by the guide device 130, in particular by the guide sheath 132, allows to significantly straighten the curvature of the wire 44 (which it adopts in particular due to its storage in wound form on the spool 42).

The use of dynamic balancing means 116 allows to achieve a dynamic and aerodynamic balance of the feed system 40, which is natural and stable.

The use of the constraint apparatus 80 and complementary constraint apparatus 86 allow to counteract possible ejection of the wire 44 by centrifugal force during rotation about the principal axis of rotation R1. The force of the actuator 81 will be set as a function of this phenomenon, particularly in the strong bearing position, while allowing in the weak bearing position, to deconvolve the wire 44 by additional rotation of the spool 42 and plate 58, mounted on the freewheel.

What is claimed is:

1. A manufacturing installation for manufacturing a manufactured object, comprising:
   a manufacturing system configured to manufacture the manufactured object by additive friction stir deposition from a manufacturing material; and
   a feed system configured to feed the manufacturing system with manufacturing material;
   the feed system comprising:
   a spool of manufacturing material wire wound about a spool axis, the manufacturing material wire presenting a neutral fiber;
   a rotary unwinding device configured to unwind the manufacturing material wire from the spool; and
   a guiding device for guiding the unwound manufacturing material wire from the rotary unwinding device to the manufacturing system;
   the rotary unwinding device being configured to:
   drive the spool in rotation about a principal axis of rotation; and
   drive the unwound manufacturing material wire in rotation about its neutral fiber.

2. The manufacturing installation according to claim 1, wherein the guiding device for guiding the unwound manufacturing material wire comprises a guide sheath extending from a proximal end connected to the rotary unwinding device to a distal end connected to the manufacturing system, the guide sheath being configured to guide the unwound manufacturing material wire from the rotary unwinding device to the manufacturing system.

3. The manufacturing installation according to claim 1, wherein the rotary unwinding device comprises:
   a support;
   a rotation mechanism mounted on the support and configured to drive the spool in rotation about the principal axis of rotation; and
   a guiding mechanism for guiding the unwound manufacturing material wire, configured to guide the unwound manufacturing material wire to the guiding device and configured to constrain the unwound manufacturing material wire so that the unwound manufacturing material wire turns about its neutral fiber at an inlet of the guiding device.

4. The manufacturing installation according to claim 3, wherein the guiding device comprises an inlet configured to receive the unwound manufacturing material wire supplied by the rotary unwinding device,
   the guiding mechanism being configured so that a trajectory of the unwound manufacturing material wire describes, between the spool and the inlet of the guiding device, substantially a conical helix trajectory, a cone of which has its apex facing the inlet of the guiding device.

5. The manufacturing installation according to claim 4, wherein the rotation mechanism is configured to drive the spool and the guiding mechanism jointly in rotation about the principal axis of rotation,
   the guiding mechanism comprising a central frame including:
   a central column extending according to a column axis coincident with the principal axis of rotation from a proximal end mounted on the rotation mechanism to a distal end mounted facing the inlet of the guiding device;
   a plurality of guide arms mounted on the central column so as to be distributed along the column axis, each guide arm extending substantially perpendicular to the column axis from the central column, each guide arm comprising a tubular guide element delimiting an orifice, for guiding the unwound manufacturing material wire, through which the unwound manufacturing material wire is intended to extend.

6. The manufacturing installation according to claim 5, wherein the tubular guide element comprises at least one rolling part, extending substantially into the guide orifice and intended to cooperate with the unwound manufacturing material wire as it passes through the guide orifice.

7. The manufacturing installation according to claim 5, wherein the central frame further comprises a dynamic balancing means mounted on the central column and arranged so that masses of the dynamic balancing means, the guide arms and the unwound manufacturing material wire are distributed substantially symmetrically about the principal axis of rotation.

8. The manufacturing installation according to claim 7, wherein the dynamic balancing means comprises a balancing wire and a plurality of balancing arms mounted on the central column so as to be distributed along the column axis, each balancing arm extending substantially perpendicular to the column axis from the central column to a radial end, each balancing arm comprising a tubular holding element delimiting an orifice, for holding the balancing wire, through which the balancing wire extends,
   the balancing arms and the balancing wire being arranged so that the mass of the balancing arms and the balancing wire is distributed symmetrically about a main axis of rotation relative to the mass of the guide arms and the unwound manufacturing material wire.

9. The manufacturing installation according to claim 3, wherein the manufacturing system comprises:
   at least one motor;
   an effector configured to be driven in rotation by the at least one motor;
   a stirring pin configured to be driven in rotation by the effector, the stirring pin being intended to stir the unwound manufacturing material wire to manufacture the manufactured object;
   a feed device for feeding the unwound manufacturing material wire, configured to displace the unwound manufacturing material wire toward the stirring pin.

10. The manufacturing installation according to claim 9, wherein a speed of rotation of the stirring pin is substantially equal to the speed of rotation of the unwound manufacturing material wire about its neutral fiber.

11. The manufacturing installation according to claim 9, wherein the principal axis of rotation is coincident with the spool axis, the rotation mechanism comprising a plate movable in rotation about the principal axis of rotation, the spool being configured to rest on the plate so that the spool axis is substantially perpendicular to the plate and so that rotation of the plate about the principal axis of rotation drives the spool in rotation about the principal axis of rotation.

12. The manufacturing installation according to claim 11, wherein the rotation mechanism further comprises:
   a motor;
   a shaft extending substantially according to the principal axis of rotation and configured to be driven in rotation by the motor about the principal axis of rotation; and a freewheel;
the plate being mounted on the shaft via the freewheel,
the rotation of the shaft about the principal axis of rotation driving the plate in rotation about the principal axis of rotation via the freewheel,
the freewheel allowing further rotation of the plate about the principal axis of rotation relative to the shaft,
the feeding of the unwound manufacturing material wire by the feed device driving the additional rotation of the plate about the principal axis of rotation relative to the shaft and the unwinding of the manufacturing material wire from the spool.

13. The manufacturing installation according to claim 12, wherein the speed of the additional rotation of the plate about the principal axis of rotation relative to the shaft is between 0 revolution per minute and 100 revolutions per minute.

14. The manufacturing installation according to claim 12, wherein the rotation mechanism further comprises means for containing the spool,
the containment means being mounted on the shaft so as to be movable in rotation about the principal axis of rotation jointly with the shaft,
the containment means comprising a containment apparatus including at least one containment element movable in translation according to a radial direction substantially orthogonal to the principal axis of rotation between:
a strong support position in which the at least one containment element bears on an outer circumference of the spool so as to secure, in rotation, the spool and the plate to the shaft; and
a weak support position in which the at least one containment element bears on the outer circumference of the spool so as to allow the additional rotation of the plate about the principal axis of rotation relative to the shaft while containing the spool, radially, relative to the principal axis of rotation.

15. The manufacturing installation according to claim 14, wherein the containment means further comprises a constraining apparatus configured to radially constrain the at least one containment element against the spool in the direction of the principal axis of rotation.

16. The manufacturing installation according to claim 14, wherein the containment means further comprises a complementary constraint apparatus configured to radially constrain the spool in the direction of the at least one containment element.

17. The manufacturing installation according to claim 3, wherein the principal axis of rotation is substantially perpendicular to the spool axis and passes through a center of the spool, the spool being mounted in rotation about the spool axis on the rotation mechanism.

18. The manufacturing installation according to claim 17, wherein the manufacturing system comprises:
at least one motor;
an effector configured to be driven in rotation by the at least one motor;
a stirring pin configured to be driven in rotation by the effector, the stirring pin being configured to stir the unwound manufacturing material wire to manufacture the manufactured object;
a feed device for feeding the unwound manufacturing material wire, configured to displace the unwound manufacturing material wire toward the stirring pin;
wherein the feeding of the unwound manufacturing material wire by the feed device drives the additional rotation of the spool about the spool axis and the unwinding of the manufacturing material wire from the spool.

19. The manufacturing installation according to claim 1, wherein the manufacturing system comprises:
at least one motor;
an effector configured to be driven in rotation by the at least one motor;
a stirring pin configured to be driven in rotation by the effector, the stirring pin being configured to stir the unwound manufacturing material wire to manufacture the manufactured object;
a feed device for feeding the unwound manufacturing material wire, configured to displace the unwound manufacturing material wire toward the stirring pin;
the manufacturing installation further comprising an auxiliary manufacturing system configured to manufacture the manufactured object or to manufacture an auxiliary manufactured object by additive friction stir deposition from the manufacturing material,
the feed system being further configured to feed the auxiliary manufacturing system with manufacturing material, the feed system further comprising an auxiliary spool of a manufacturing material wire wound about an auxiliary spool axis,
the rotary unwinding device being further configured to unwind the manufacturing material wire from the auxiliary spool, the feed system further comprising a device for auxiliary guiding of the unwound manufacturing material wire of the auxiliary spool from the rotary unwinding device to the auxiliary manufacturing system,
the auxiliary manufacturing system comprising:
an auxiliary stirring pin configured for stirring the unwound manufacturing material wire from the auxiliary spool to manufacture the manufactured object or the auxiliary manufactured object; and
an auxiliary feed device for feeding the unwound manufacturing material wire from the auxiliary spool, configured to displace the unwound manufacturing material wire from the auxiliary spool toward the auxiliary stirring pin;
the stirring pin and the auxiliary stirring pin being able to be arranged in a symmetrical manner relative to a plane of symmetry, so that vectors of forces exerted respectively by the stirring pin and by the auxiliary stirring pin are of substantially equal norms but of opposite directions, and so that the manufacturing material of the spool and the auxiliary manufacturing material of the auxiliary spool are stirred and fed according to respective symmetrical trajectories.

20. A method for manufacturing a manufactured object from a manufacturing material using the manufacturing installation according to claim 1, the method comprising:
feeding the manufacturing system with manufacturing material by the feed system; and
manufacturing the manufactured object by additive friction stir deposition from the manufacturing material by the manufacturing system;
the feeding step comprising unwinding the manufacturing material wire from the spool by the rotary unwinding device and guiding the unwound manufacturing material wire from the rotary unwinding device to the manufacturing system by the guiding device,
the unwinding further comprising:
rotating the spool about the principal axis of rotation; and rotating the unwound manufacturing material wire about its neutral fiber by the rotary unwinding device.

* * * * *